(12) United States Patent
Doi

(10) Patent No.: US 9,327,399 B2
(45) Date of Patent: May 3, 2016

(54) MOVEMENT CONTROL METHOD FOR MOBILE ROBOT

(71) Applicant: TOYOTA JIDOSHA KABUSHIKI KAISHA, Toyota-shi, Aichi-ken (JP)

(72) Inventor: Masahiro Doi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/618,184

(22) Filed: Feb. 10, 2015

(65) Prior Publication Data
US 2015/0231786 A1 Aug. 20, 2015

(30) Foreign Application Priority Data
Feb. 19, 2014 (JP) ................. 2014-029793

(51) Int. Cl.
B25J 9/16 (2006.01)
B62D 57/00 (2006.01)
B62D 57/032 (2006.01)

(52) U.S. Cl.
CPC ............. *B25J 9/1605* (2013.01); *B62D 57/032* (2013.01)

(58) Field of Classification Search
CPC ............................ B25J 9/1605; B62D 57/032
See application file for complete search history.

(56) References Cited

U.S. PATENT DOCUMENTS

| 5,459,659 | A | 10/1995 | Takenaka | |
| 6,520,727 | B1 * | 2/2003 | Babbs | H01L 21/67271 414/217 |
| 2005/0151497 | A1 | 7/2005 | Nagasaka | |
| 2006/0097683 | A1 * | 5/2006 | Hosoda | B25J 5/007 318/568.12 |
| 2007/0185618 | A1 * | 8/2007 | Nagasaka | B62D 57/032 700/245 |
| 2010/0161117 | A1 * | 6/2010 | Kwak | B62D 57/032 700/245 |
| 2013/0151009 | A1 * | 6/2013 | Okazaki | B25J 13/085 700/260 |

FOREIGN PATENT DOCUMENTS

| JP | 3269852 B2 | 4/2002 |
| JP | 2005-177884 A | 7/2005 |
| JP | 2006341341 A | * 12/2006 |
| JP | 2009-107030 A | 5/2009 |
| JP | 2011-200991 A | 10/2011 |
| JP | 5034235 B2 | 9/2012 |
| WO | 2015/087504 A1 | 6/2015 |

* cited by examiner

*Primary Examiner* — Rodney Butler
(74) *Attorney, Agent, or Firm* — Oliff PLC

(57) ABSTRACT

A prediction model for predicting a mobile robot state is constructed to represent a state change of the mobile robot in a prediction interval of a predetermined duration; time-series data on a control input to ensure stability of the mobile robot is obtained in the prediction interval using a predetermined stability evaluation criterion and a constraint condition based on a mechanical balance; a center-of-gravity trajectory of the mobile robot is obtained based on the time-series data and prediction model; a slack variable for relaxing a constraint is introduced into a constraint condition; a slack variable is introduced into the stability evaluation criterion such that the variable becomes zero when a solution to a stable trajectory is obtained under the constraint condition and a slack variable value is generated when the trajectory diverges under the constraint condition; and positions of contact points are changed so as to cancel the generated value.

8 Claims, 31 Drawing Sheets

CONTACT FORCES (SIX-AXIS FORCES)

$$f = [f_x f_y f_z]^T$$

$$\tau = [\tau_x \tau_y \tau_z]^T$$

(1)
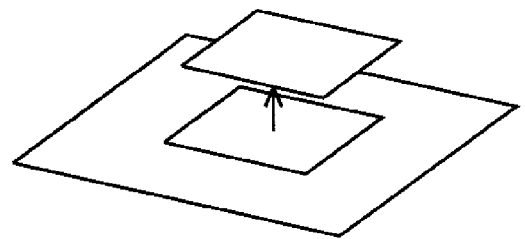
(2)
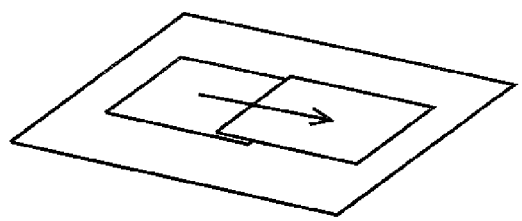
(3)
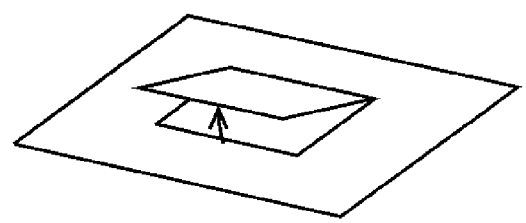
Fig. 14

MASS : $m_i$
POSITION : $s_i = [x_i\, y_i\, z_i]^T$

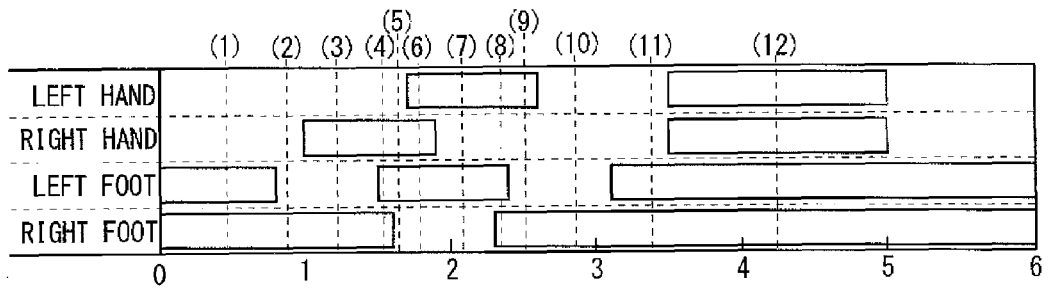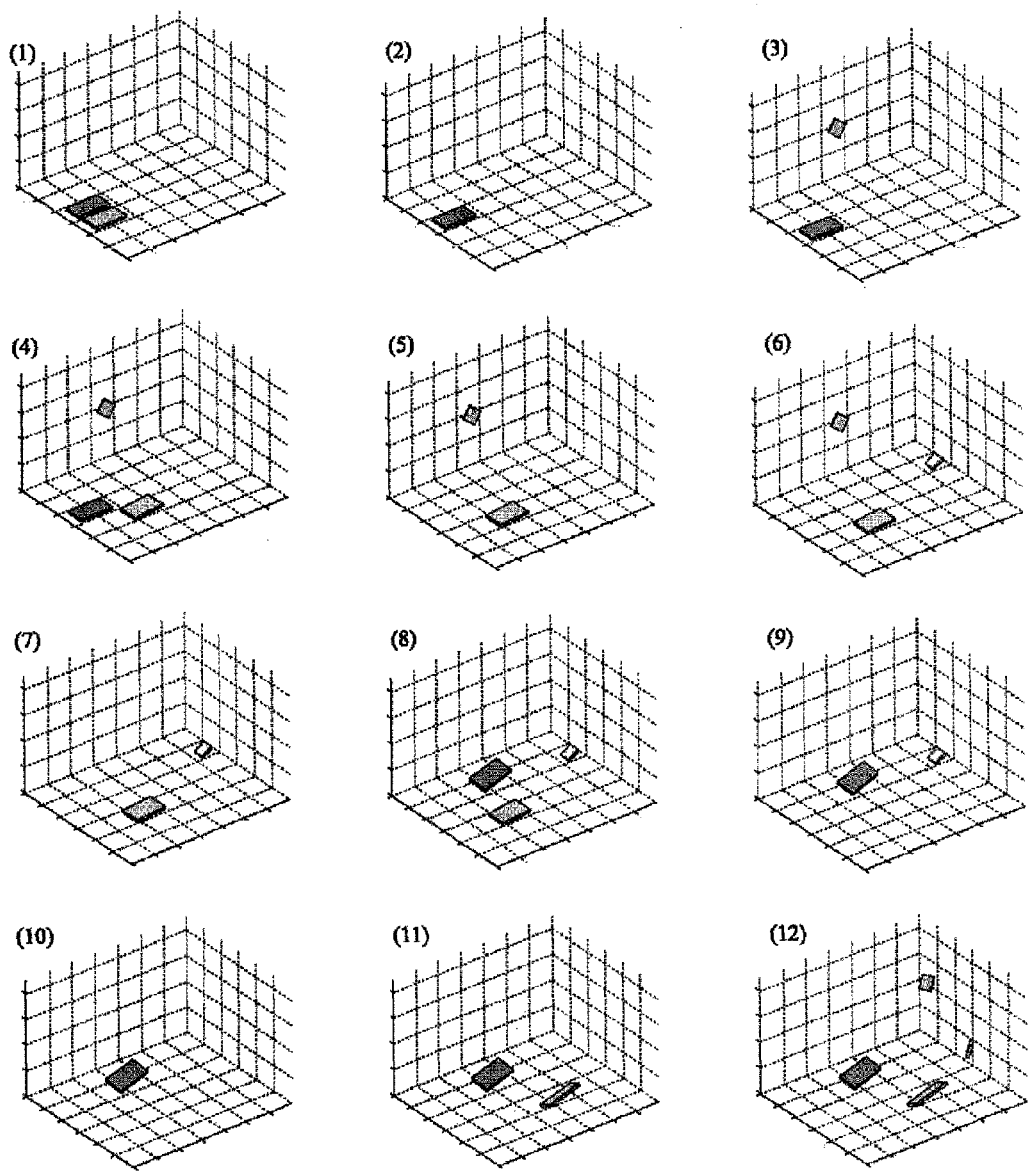
Fig. 25

MOVEMENT CONTROL METHOD FOR MOBILE ROBOT

INCORPORATION BY REFERENCE

This application is based upon and claims the benefit of priority from Japanese patent application No. 2014-029793, filed on Feb. 19, 2014, the disclosure of which is incorporated herein in its entirety by reference.

BACKGROUND OF THE INVENTION

1. Field of the Invention

The present invention relates to a control of a mobile robot, and more particularly, to a trajectory generation technique for generating a trajectory that enables a mobile robot to move stably.

2. Description of Related Art

Robots having an autonomous movement function have been developed. A typical example of such robots is a legged robot which walks on two legs. Stable bipedal movement of a bipedal robot is achieved by trajectory generation and motion control using a ZMP (For example, Japanese Unexamined Patent Application Publication No. 2005-177884)

SUMMARY OF THE INVENTION

It is expected that future robots will work in various environments. For example, it is expected that service robots will work in the same living space as humans. It is considered that a bipedal walking ability is not sufficient to enable the robots to move in an environment such as a living space. For example, a state as shown in FIG. 1 is assumed to occur. Referring to FIG. 1, a table is placed near the wall and a bottle is placed at the back of the table near the wall. It is impossible for the robot to grip the bottle by using only bipedal walking. It is necessary for the robot to move while placing its hand(s) on the wall and the table and to stretch its hand(s) by inclining its body. Thus, the service robots need to have an ability to perform a motion while contacting the environment at a plurality of arbitrary points.

For convenience of the following description, the motion (movement) of the robot while contacting the environment at a plurality of arbitrary points is herein referred to as "multipoint contact movement". (However, it cannot be said that a smooth multipoint contact movement can be achieved by the method disclosed in Japanese Patent No. 5034235, and the method has various problems. The details of this method will be described in exemplary embodiments of the invention).

When a service robot that can achieve the multipoint contact movement is put into practical use, it is essential to improve the stability of the robot. There is a need to take into account a case where the posture of the robot deviates from an assumed posture when the real robot is actually operated. The joints of the robot may not operate as instructed, or errors may accumulate. If the robot and humans are in the same space, the humans or objects might come into contact with the robot. If the hand(s) and foot (feet) of the robot land (hand(s) is(are) placed) on the planned positions even when the posture of the robot deviates from the assumed position due to some disturbances, it is obviously difficult for the robot to maintain its stability, with the result that the control of the robot fails (diverges). In other words, if the hand(s) and foot (feet) of the robot land as planned even when the center of gravity of the robot begins to incline from the assumed position, the center of gravity further inclines.

When the posture of the robot deviates from the assumed position, it is possible to change the landing points from the planned points, to thereby maintain the stability of the center of gravity. There are some known techniques for enabling bipedal robots to improve their stability by changing the landing position of an idling leg, that is, techniques to prevent bipedal robots from overturning by changing the planned landing position (for example, Japanese Patent No. 3269852).

Most of the related art techniques for stabilizing humanoid robots relate to stabilization of bipedal walking. Up to now, few techniques have been developed to deal with the multipoint contact movement. It can be said that bipedal walking is a type of the multipoint contact movement, because bipedal walking is an operation in which the robot moves while switching from a single-foot state to a both-feet state and vice versa. However, there is a large difference between the technique for bipedal walking and the technique for multipoint contact movement. Many of the bipedal walking techniques (typified by ZMP) are based on the premise that contact points (for example, the left foot and the right foot of a two-leg robot) are included in the same plane (as disclosed in, for example, paragraph 0012 of Japanese Patent No. 5034235). Specifically, in the ZMP control, only two-dimensional information in the original six-dimensional force/moment can be expressed, and thus the transition of only an extremely limited contact state can be treated. In the related art stabilization techniques based on the ZMP, the case of the multipoint contact movement cannot be solved in principle. In other words, there has been no technique for "improving the stability by changing positions of contact points, as needed, while performing a multipoint contact movement according to contact-point planning". (As a result of making a search, no Japanese patent application or academic paper that discloses the above-mentioned technique was found).

It is an object of the present invention is to provide a control method for a mobile robot that automatically generates a stable trajectory based on contact-point planning, and more particularly, to provide a control method for a mobile robot that improves the stability thereof by changing positions of contact points, as needed, while performing a multipoint contact movement according to contact-point planning.

A movement control method for a mobile robot according to a first exemplary aspect of the present invention is a movement control method for a mobile robot that moves while causing two or more mobile means to alternately contact the ground, the movement control method including: a contact-point planning setting step of setting contact-point planning using time-series data representing positions of contact points where the mobile means contact the ground; and a trajectory generation step of generating a trajectory for a movement of the mobile robot while causing the mobile means to contact the ground at the contact points as set in the contact-point planning setting step. The trajectory generation step includes changing the positions of the contact points when the trajectory diverges.

In the first exemplary aspect of the present invention, the trajectory generation step preferably includes: constructing a prediction model that describes a relationship between a control input to the mobile robot and a motion of the mobile robot, the prediction model representing a state change of the mobile robot in a prediction interval of a predetermined duration; obtaining, in the prediction interval, time-series data on the control input to ensure the stability of the mobile robot, by using a predetermined stability evaluation criterion and a constraint condition based on a mechanical balance; obtaining a trajectory of the mobile robot based on the obtained time-series data on the control input and the prediction model; introducing a slack variable for relaxing a constraint into the constraint condition; introducing a slack variable into the stability evaluation criterion in such a manner that the slack variable becomes substantially zero when a solution to a stable trajectory is obtained under the constraint condition and a value equal to or greater than substantially zero is generated as the slack variable when the trajectory diverges under the constraint condition; and changing the positions of the contact points so as to cancel the generated value of the slack variable.

In the first exemplary aspect of the present invention, when the slack variable is introduced into the constraint condition, the slack variable is preferably introduced into an equation of equilibrium for a moment around an X-axis of a center of gravity of the mobile robot and into an equation of equilibrium for a moment around a Y-axis of the center of gravity of the mobile robot, the X-axis and the Y-axis being orthogonal to each other within a plane perpendicular to a Z-axis corresponding to a vertical direction.

In the first exemplary aspect of the present invention, the prediction interval is preferably separated into an unadjustable sub-interval including no contact points whose positions can be changed, and an adjustable sub-interval including one or more contact points whose positions can be changed, and a value equal to or greater than substantially zero is preferably allowed to be generated as the slack variable only during the adjustable sub-interval.

In the first exemplary aspect of the present invention, an expression for the constraint condition preferably includes a center-of-gravity vertical trajectory of the mobile robot and a trajectory of a moment around the center of gravity of the mobile robot, and the trajectory generation step preferably includes: temporarily setting the center-of-gravity vertical trajectory and the trajectory of the moment around the center of gravity of the mobile robot one time within the prediction interval; obtaining a solution to a function of the stability evaluation criterion one time under the constraint condition, and changing, based on an obtained result, the positions of the contact points so as to stabilize the motion of the mobile robot within the prediction interval and correcting the center-of-gravity vertical trajectory and the trajectory of the moment around the center of gravity of the mobile robot; and recalculating, at least one time, the solution to the function of the stability evaluation criterion by using the changed positions of the contact points, the corrected center-of-gravity vertical trajectory, and the corrected trajectory of the moment around the center of gravity.

In the first exemplary aspect of the present invention, the trajectory is obtained within the prediction interval in the trajectory generation step; the mobile robot is driven by using data on a first point of the prediction interval as a current input value; and the trajectory generation step is repeated by advancing the prediction interval by a small amount of time.

A mobile robot according to a second exemplary aspect of the present invention is a mobile robot that moves while causing two or more mobile means to alternately contact the ground, the mobile robot including: a contact-point planning setting unit that sets contact-point planning using time-series data representing positions of contact points where the mobile means contact the ground; and a trajectory generation unit that generates a trajectory for a movement of the mobile robot while causing the mobile means to contact the ground at the contact points as set by the contact-point planning setting unit. The trajectory generation unit changes the positions of the contact points when the trajectory diverges.

In the second exemplary aspect of the present invention, the trajectory generation unit is preferably configured to: construct a prediction model that describes a relationship between a control input to the mobile robot and a motion of the mobile robot, the prediction model representing a state change of the mobile robot in a prediction interval of a predetermined duration; obtain, in the prediction interval, time-series data on the control input to ensure the stability of the mobile robot, by using a predetermined stability evaluation criterion and a constraint condition based on a mechanical balance; obtain a trajectory of the mobile robot based on the obtained time-series data on the control input and the prediction model; introduce a slack variable for relaxing a constraint into the constraint condition; introduce a slack variable into the stability evaluation criterion in such a manner that the slack variable becomes substantially zero when a solution to a stable trajectory is obtained under the constraint condition and a value equal to or greater than substantially zero is generated as the slack variable when the trajectory diverges under the constraint condition; and change the positions of the contact points so as to cancel the generated value of the slack variable.

According to the present invention, the mobile robot can autonomously move while automatically generating a stable center-of-gravity trajectory based on the set contact-point planning. At this time, a failure of control can be avoided by changing the contact points as needed, thereby improving the stability.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 14 is a diagram illustrating a case where the contact points become unstable.

FIG. 25 is a diagram showing contact-point planning in which the hands and feet of a quadruped walking robot are allowed to randomly land;

DESCRIPTION OF THE EXEMPLARY EMBODIMENTS

Figure 1:
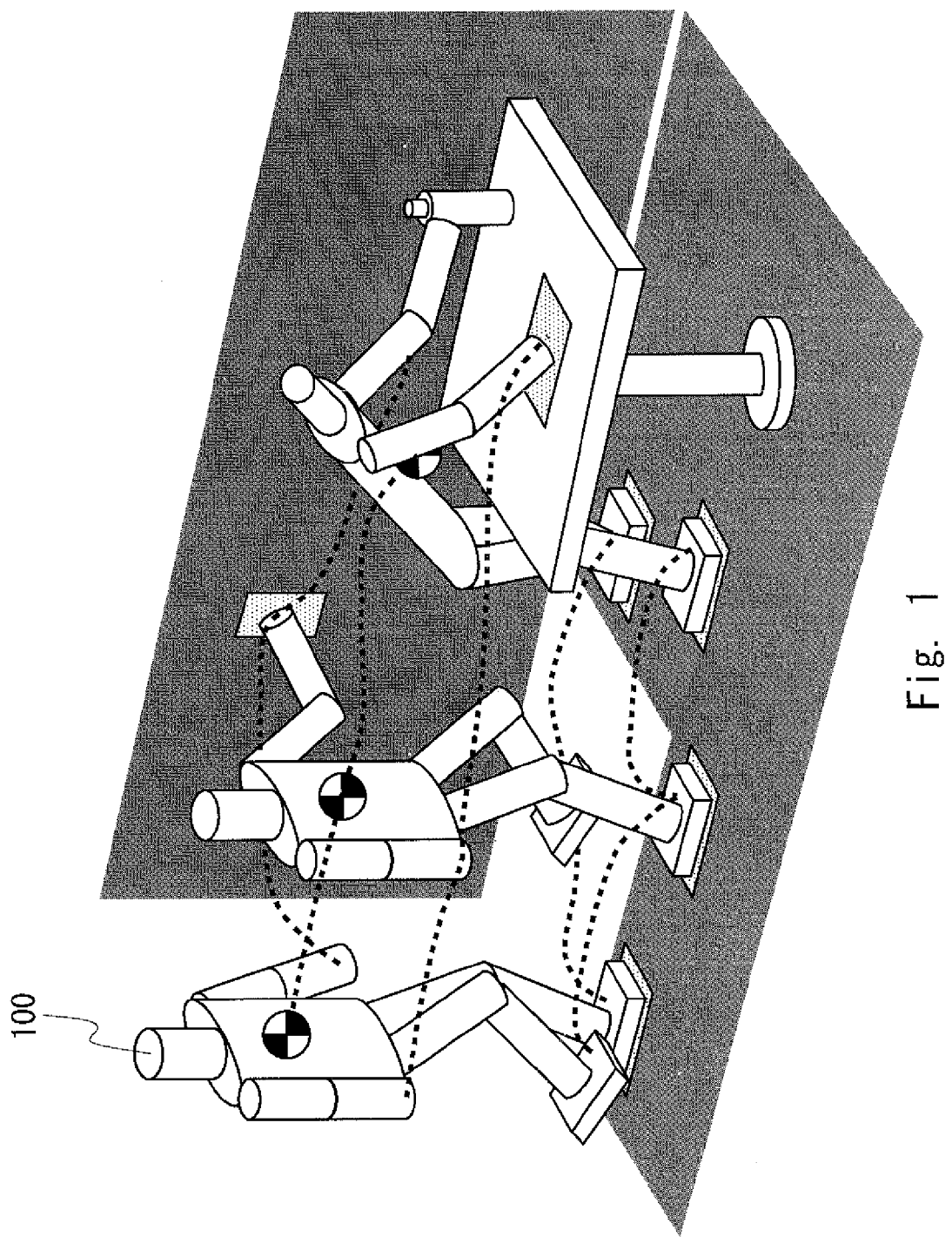
FIG. 1 is a view showing an example of a motion of a robot.

Exemplary embodiments of the present invention will be described with reference to the reference numerals denoting elements in the drawings.

First Exemplary Embodiment

This exemplary embodiment is characterized by a mobile robot control device, and specifically, by a mobile robot control device that generates a trajectory for controlling a movement operation of a mobile robot. Prior to the description of a specific control (trajectory generation), the hardware configuration of the mobile robot to be controlled will be described.

Figure 2:
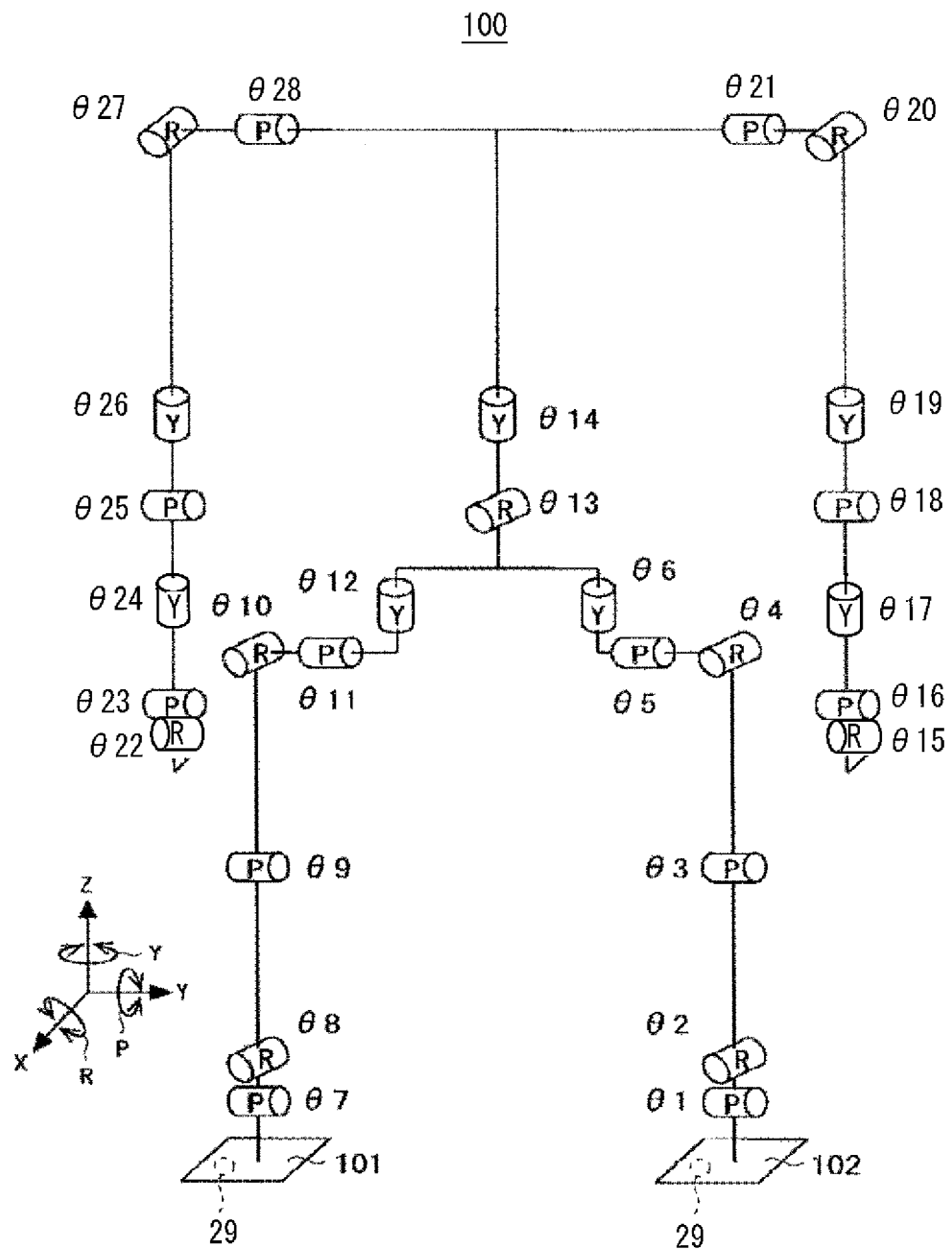
FIG. 2 is a diagram showing an example of a mechanical structure of a mobile robot.

FIG. 2 is a diagram showing an example of a mechanical structure of the mobile robot.

In a mobile robot 100, each hip joint is composed of three axes; each knee joint is composed of one axis; each ankle joint is composed of two axes; each shoulder joint is composed of three axes (shoulder pitch, shoulder roll, and shoulder yaw); each elbow joint is composed of one axis (elbow pitch); and each wrist joint is composed of three axes (wrist yaw, wrist pitch, and wrist roll). (Although the mechanical structure of the mobile robot is not limited to the above one, six or more degrees of freedom of movement of hands (arms) and six or more degrees of freedom of movement of feet (legs) are necessary).

The mobile robot 100 includes encoder-equipped motors 1, 2, . . . , and 28 which are provided at the respective joints.

Motors (joint driving means) 1a, 2a, . . . , and 28a (see FIG. 3) which are provided at the respective joints can respectively adjust joint angles $\theta 1, \theta 2, \ldots,$ and $\theta 28$ of the respective joints.

On the other hand, encoders (joint angle detection means) 1b, 2b, and 28b which are provided at the respective joints can respectively measure the joint angles $\theta 1, \theta 2, \ldots,$ and $\theta 28$ of the respective joints.

The mobile robot 100 also includes contact force sensors 29 which are provided at each foot section (foot sole section) and each hand section (palm section).

Figure 4:
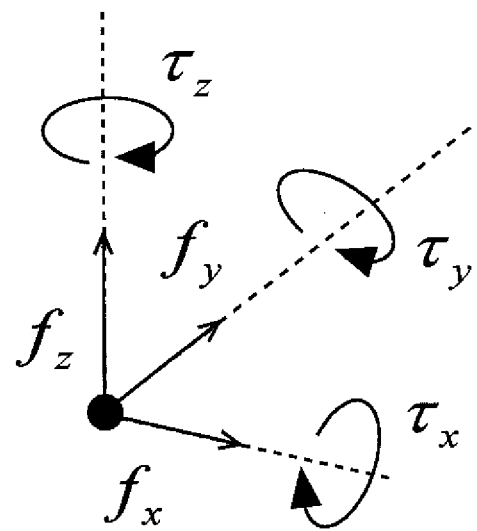
FIG. 4 is a diagram showing six-axis forces.

The contact forces herein described refer to six-axis forces. As shown in FIG. 4, the contact forces include a set $(f_x, f_y, f_z)^T$ of forces f in x-axis, y-axis, and z-axis directions, and a set $(\tau_x, \tau_y, \tau_z)^T$ of forces $\tau$ around the x-axis, the y-axis, and the z-axis. (The x-axis and the y-axis are orthogonal to each other within a plane perpendicular to the z-axis corresponding to the vertical direction.)

This mobile robot moves while bringing at least one of the right foot, the left foot, the right hand, and the left hand thereof into contact with a floor, a wall, a table, or the like during a movement.

Accordingly, the right foot, the left foot, the right hand, and the left hand are also referred to as contact point candidates in the following description.

The hands and feet of the robot indicate mobile means.

Figure 3:
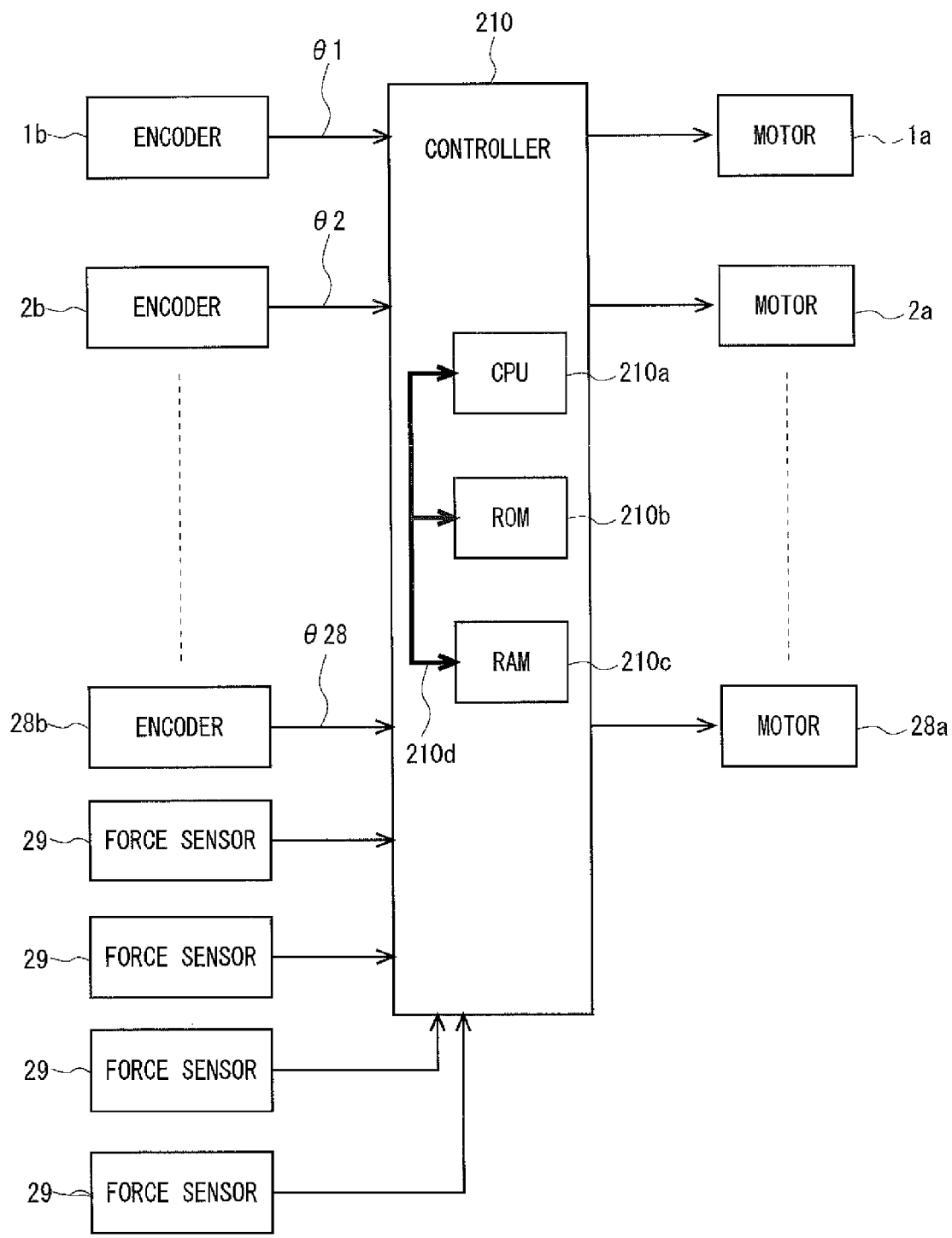
FIG. 3 is a functional block diagram of the mobile robot.

FIG. 3 is a functional block diagram of the mobile robot 100.

The mobile robot 100 includes the motors 1a to 28a and the encoders 1b to 28b, which are provided at the respective joints, the force sensors 29, and a controller 210.

The controller 210 receives sensor detected values from the encoders 1b to 28b and the force sensors 29 at the respective joints. The controller 210 outputs drive signals to the motors 1a to 28a at the respective joints.

The controller 210 includes, as a main hardware configuration, a microcomputer including a CPU (Central Processing Unit) 210a, a ROM (Read Only Memory) 210b, and a RAM (Random Access Memory) 210c. The CPU 210a performs control processing, arithmetic operation processing, and the like. The ROM 210b stores a control program, an arithmetic operation program, and the like which are executed by the CPU 210a. The RAM 210c temporarily stores processed data and the like. The CPU 210a, the ROM 210b, and the RAM 210c are connected to each other via a data bus 210d. Necessary programs may be recorded in a nonvolatile recording medium and the programs may be installed in the controller 210 from the nonvolatile storage medium as needed.

Figure 5:
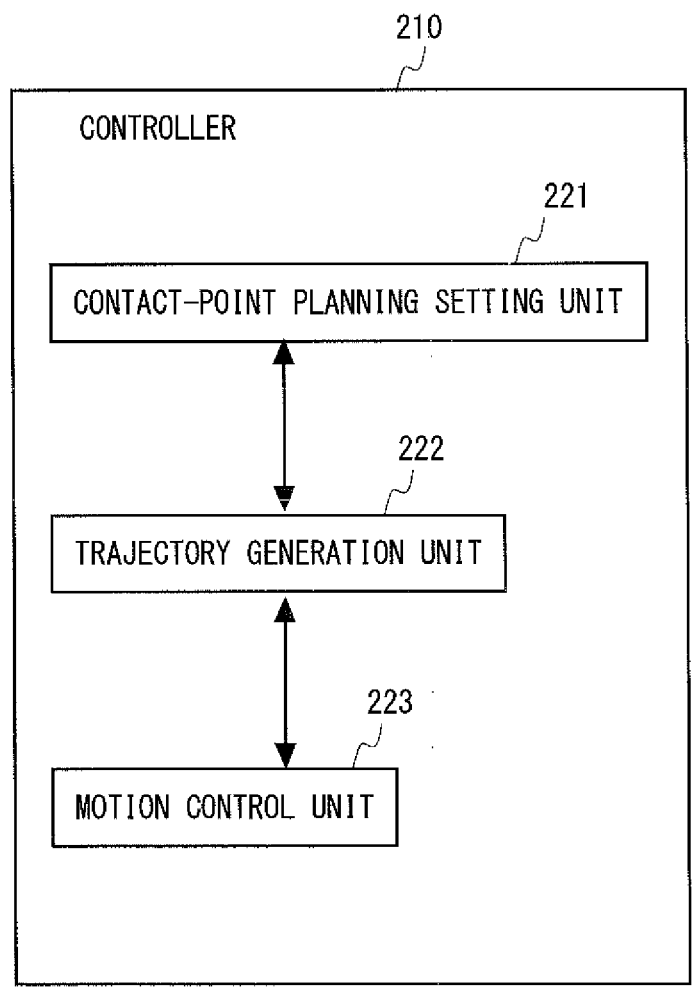
FIG. 5 is a functional block diagram of a controller.

FIG. 5 shows a functional block diagram of the controller 210.

The controller 210 includes a contact-point planning setting unit 221, a trajectory generation unit 222, and a motion control unit 223. The contact-point planning setting unit 221 stores contact-point planning which is instructed by a user. The trajectory generation unit 222 generates a trajectory which can be stably executed. The motion control unit 223 causes the mobile robot 100 to execute the entire body motion according to the generated trajectory.

In this case, the trajectory generation unit 222 generates the trajectory that allows the mobile robot to execute the motion according to the contact-point planning. However, the trajectory generation includes changing of contact points as needed.

Detailed processing operations of these functional units will be described later.

(Trajectory Generation Method for Multipoint Contact Movement)

The present invention has features of: (1) generating a trajectory that achieves a multipoint contact movement; and (2) changing contact points as needed. The feature that is intended to be claimed by this application at the time of filing of the present application is the feature (2) of changing (correcting) contact points so as to improve the stability of the multipoint contact movement.

However, since it cannot be said that the trajectory generation method for multipoint contact movement is a known technique at present, the method for (1) generating a trajectory that achieves a multipoint contact movement will now be described.

Note that the applicant of the present application filed Japanese Patent Application No. 2013-254989 (filed on Dec. 10, 2013), but the patent application has not been published yet.

As described above, Japanese Patent No. 5034235 discloses a control system which has been developed to deal with the multipoint contact movement.

According to the present invention, a trajectory for multipoint contact movement may be generated by the method disclosed in Japanese Patent No. 5034235, and in addition, the contact points may be corrected by the below-described method. (Furthermore, since the present invention focuses on the feature "(2) changing contact points as needed", detailed methods for trajectory generation are not limited to the method disclosed in Japanese Patent No. 5034235, as long as the multipoint contact movement can be achieved).

In other words, the present invention does not exclude the method disclosed in Japanese Patent No. 5034235 as the trajectory generation method. However, the method disclosed in Japanese Patent No. 5034235 has problems as described below.

The technique disclosed in Japanese Patent No. 5034235 has a problem that if contact-point planning, as well as a target center-of-gravity position and a target momentum, are not given, a stable trajectory cannot be generated.

In the first place, it is difficult to predict the future target center-of-gravity position, so it is impossible for a user to set the future center-of-gravity position which is an unknown control target value.

It is desirable that the user provide the robot with only the contact-point planning and the robot autonomously move while automatically generating a stable center-of-gravity trajectory based on the set contact-point planning.

The technique disclosed in Japanese Patent No. 5034235 has another problem that a change in the force associated with switching of contact points (transition of contact states) is steep, which makes it difficult to obtain a smooth transition of the force.

In order to cause a mobile robot to stably perform the multipoint contact movement, it is necessary to employ a technique for distributing contact forces smoothly and appropriately according to contact points, which vary from hour to hour, and for generating a stable center-of-gravity trajectory.

For this reason, the present inventors have tried to use a model prediction control.

First, the outline of the model prediction control will be described.

(Brief Description of Model Prediction Control)

For example, assume the case where a robot is caused to execute a movement operation as shown in FIG. 1.

Assume herein a series of motions that cause a humanoid robot having two arms and two legs to grip a bottle which is placed at the back of a table.

In this case, the user creates contact-point planning to execute the series of motions (task).

Figure 6:
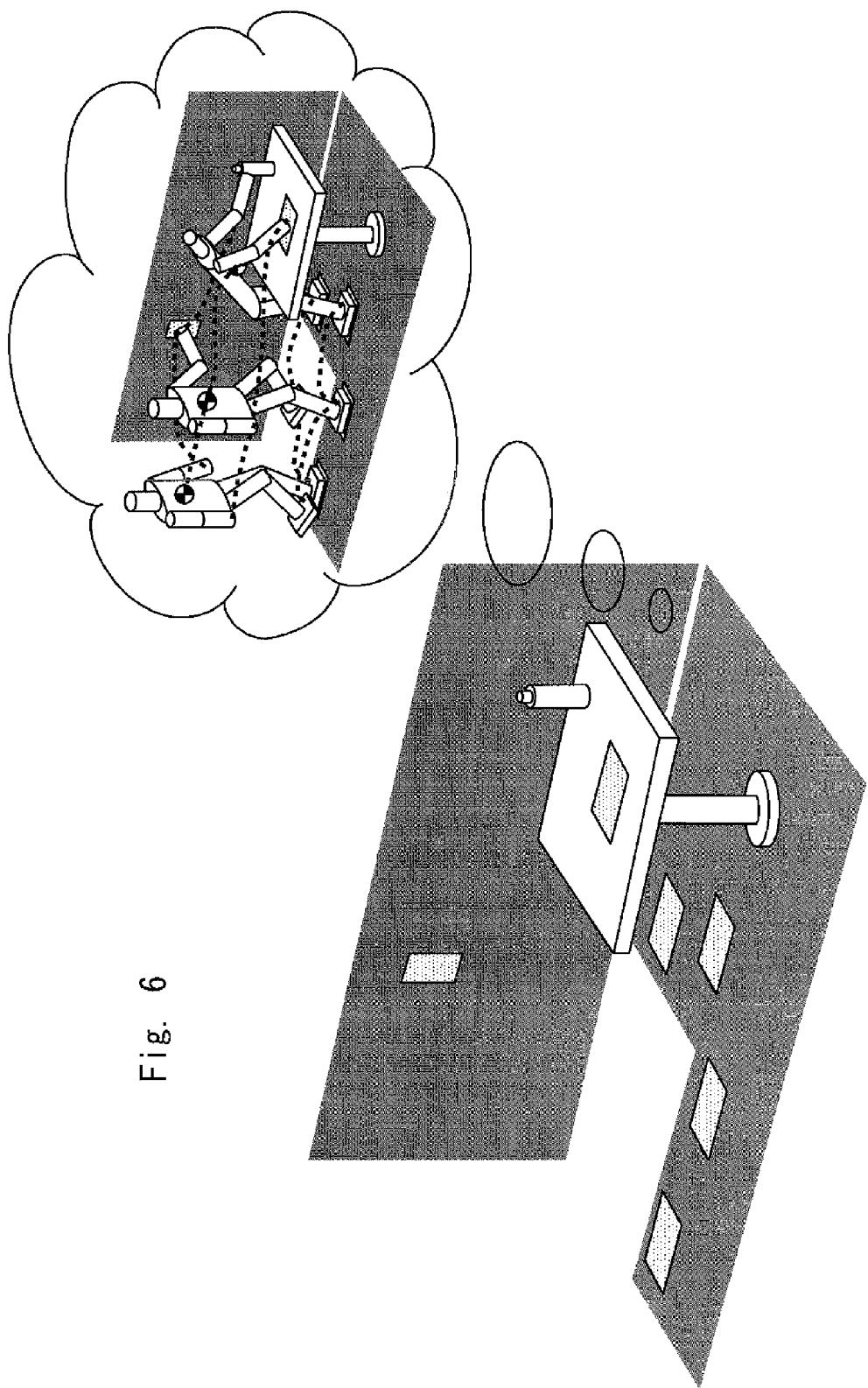
FIG. 6 is a view showing an example of an outline of contact-point planning.

Specifically, as shown in FIG. 6, the planning is created to determine where and how to place the hands and feet and the order in which the hands and feet are placed.

In FIG. 6, locations where the feet and hands are brought into contact with the floor, the wall, and the table are marked.

Figure 7:
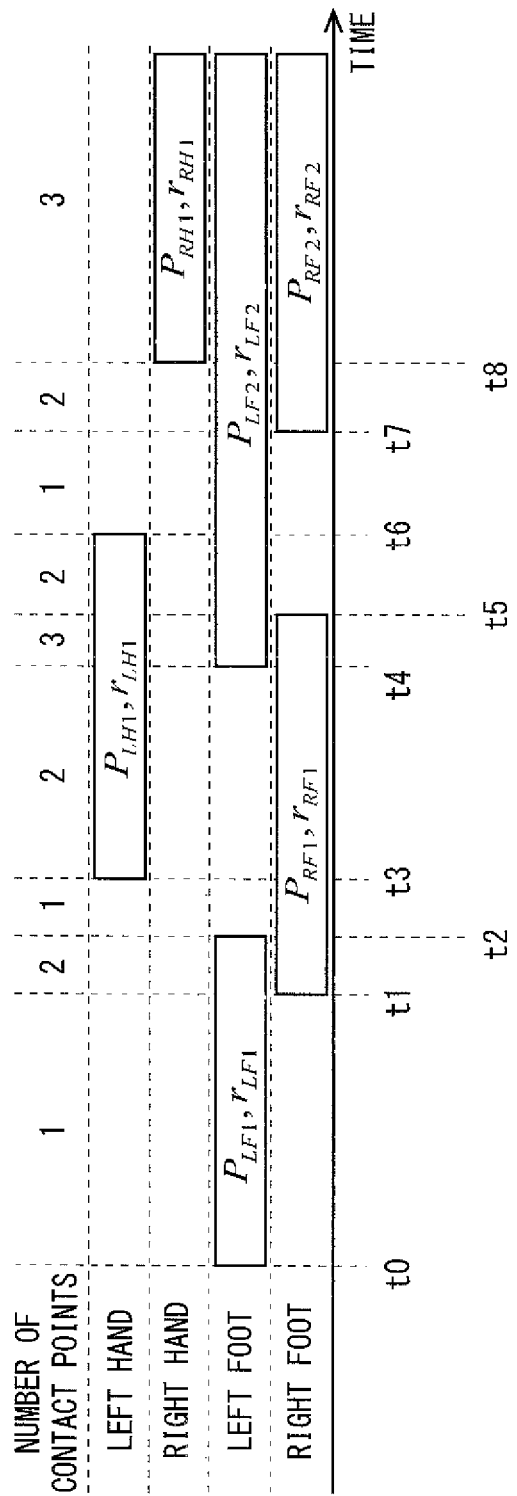
FIG. 7 is a diagram showing an example of contact-point planning.

This contact-point planning is specifically shown in FIG. 7.

The contact-point planning is time-series data representing where and how the left hand (LH), the right hand (RH), the left foot (LF), and the right foot (RF) are placed and the order in which the left hand, the right hand, the left foot, and the right foot are placed.

The correspondence relationship among FIGS. 1, 6, and 7 will be briefly described.

The robot, which stands on the left foot at first (t0), moves the right foot, which is an idling leg, to step forward and then causes the right foot to be landed (t1).

In order to instruct the mobile robot to execute the motion planning, it is necessary to specify a coordinate $P_{LF1}$ of a contact point on the floor on which the left foot is first landed, a posture $r_{LF1}$ of the left foot at that time, a coordinate $P_{RF1}$ of a contact point on the floor on which the right foot is landed, and a posture $r_{RF1}$ of the right foot at that time.

The coordinates of each contact point are represented by a set of space coordinates $P=(P_x, P_y, P_z)$.

The posture refers to the direction of the sole of each foot when the foot is landed on the contact point. The posture is represented by, for example, a set of Euler angles $r=(r_x, r_y, r_z)$. (Specifically, $r_x$, $r_y$, and $r_z$ represent a roll angle, a pitch angle, and a yaw angle, respectively.)

The following description also applies to the coordinates of the contact points on which the feet are landed and the form for instructing the posture at that time, and thus the description thereof will be omitted as appropriate.

After standing on both feet, the mobile robot moves the left foot to step forward (t2) and then causes the left foot to be landed (t4).

During this time, the left hand is placed on the wall (t3).

In this case, a coordinate Pull of a contact point on the wall where the left hand is placed and a posture $r_{LH1}$ of the left hand are specified.

The coordinates of each contact point are represented as a set of space coordinates $P=(P_x, P_y, P_z)$. The posture refers to the direction of the palm of each hand when the hand is placed on the contact point. The posture is represented by a set of Fuler angles $r=(r_x, r_y, r_z)$.

Since the subsequent contact-point planning is apparent from FIGS. 1, 6, and 7, the description thereof is omitted.

In this manner, the user creates the contact-point planning as time-series data.

When the contact-point planning thus created is input to the mobile robot, the mobile robot autonomously moves while generating a trajectory to achieve the contact-point planning.

At this time, the mobile robot performs a model prediction control during the process of trajectory generation.

Specifically, a trajectory that allows the mobile robot to stably move within a prediction interval having a certain duration is generated, and the trajectory that enables a stable motion is sequentially updated while gradually shifting the prediction interval by a small amount of time ($\Delta t$).

Figure 8:
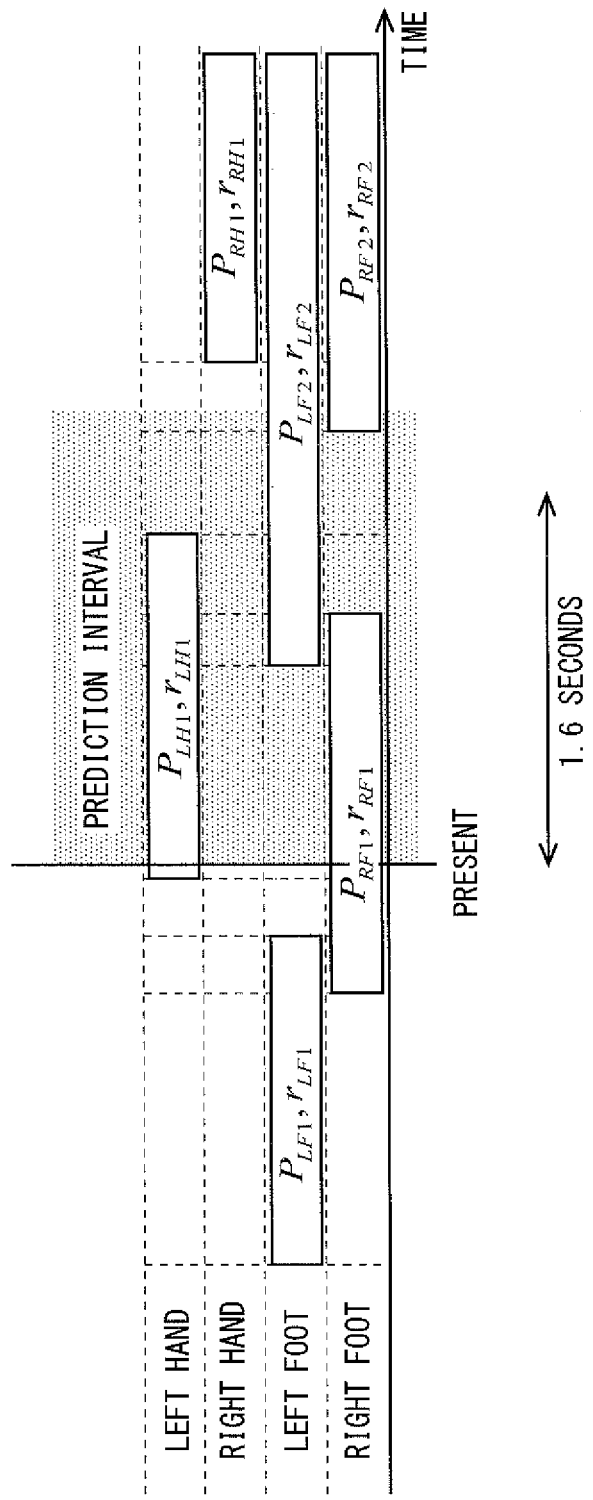
FIG. 8 is a diagram showing an example of a prediction interval.

FIG. 8 shows an example of the prediction interval.

An interval between the present time and the expiration of a predetermined time (for example, 1.6 seconds) is set as the prediction interval.

Further, a stable trajectory is generated so as not to diverge in the prediction interval.

Figure 9:
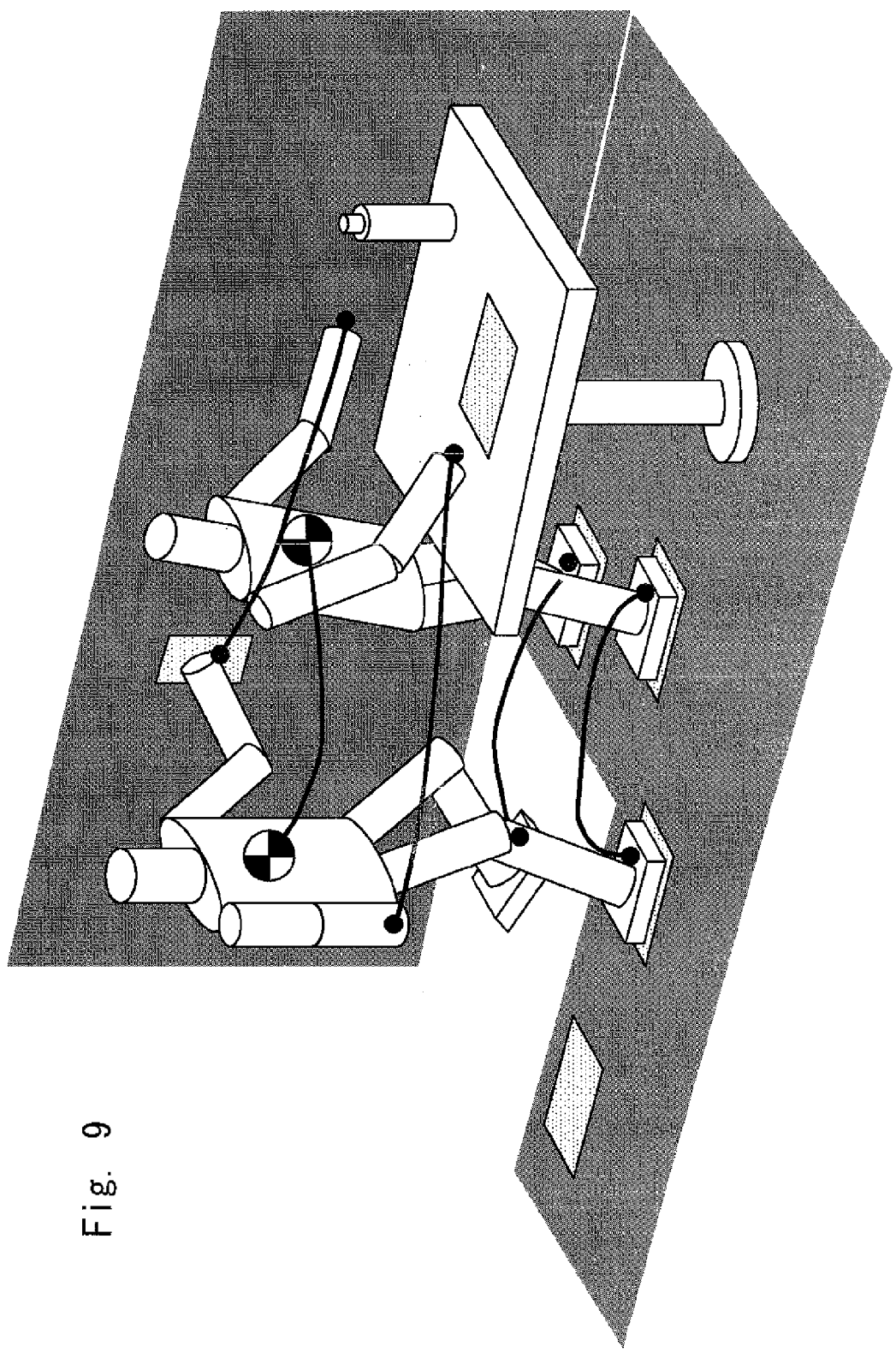
FIG. 9 is a view showing a motion in the prediction interval.

FIG. 9 shows the image of the motion in the prediction interval.

After a stable trajectory is generated in the prediction interval having a certain duration as described above, only a first point of the trajectory is used as a current input value.

Figure 10:
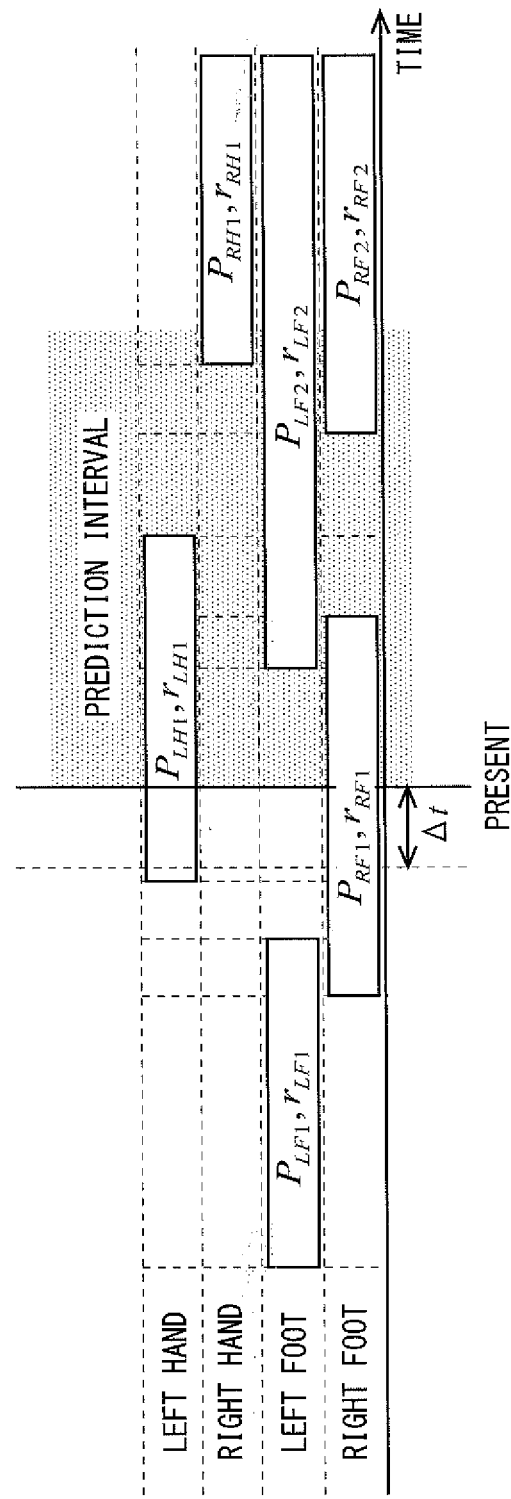
FIG. 10 is a diagram for explaining a shift in the prediction interval.

In the next trajectory update period (after Δt seconds), the prediction interval is shifted and a stable trajectory is generated in a new prediction interval in a similar manner to that in the previous trajectory update period (see FIG. 10).

The trajectory that does not diverge in the prediction interval is to be generated by setting an interval between the present time and the expiration of a certain period of time as the prediction interval as described above, instead of focusing only on the present time, or the next control period (Δt seconds) from the present time.

The mobile robot can stably move by repeating the above-described process.

The problem here is how to distribute the contact forces smoothly and appropriately according to the contact points, which vary from hour to hour, in the prediction interval having a certain duration, and how to generate a stable center-of-gravity trajectory.

The present inventors have conceived the idea that the problem with the generation of a stable trajectory in a certain prediction interval can be reduced to a convex quadratic programming problem (Quadratic Programming: QP).

Specifically, a stable trajectory for multipoint contact movement is obtained by solving the problem of minimizing an evaluation function J including the sum of squares of the contact forces at each contact point and the sum of squares of differential values of the six-axis forces.

Next, the derivation of the evaluation function J and the solution thereof (reducing to a convex quadratic programming problem) will be described.

This solution indicates that time-series data on the center-of-gravity position, the center-of-gravity velocity, the contact forces, and the differential values of the contact forces, which are used to achieve a stable multipoint contact movement within a certain prediction interval, is obtained. (In the following description, assume that the hands and feet are placed on the positions (contact points) as instructed by the contact-point planning. In other words, there is no need to consider the case in which the contact points are changed. While it is necessary to take some measures, such as relaxation of a condition expression or an evaluation expression, to change the contact points as needed, these will be described in detail later).

Figure 11:
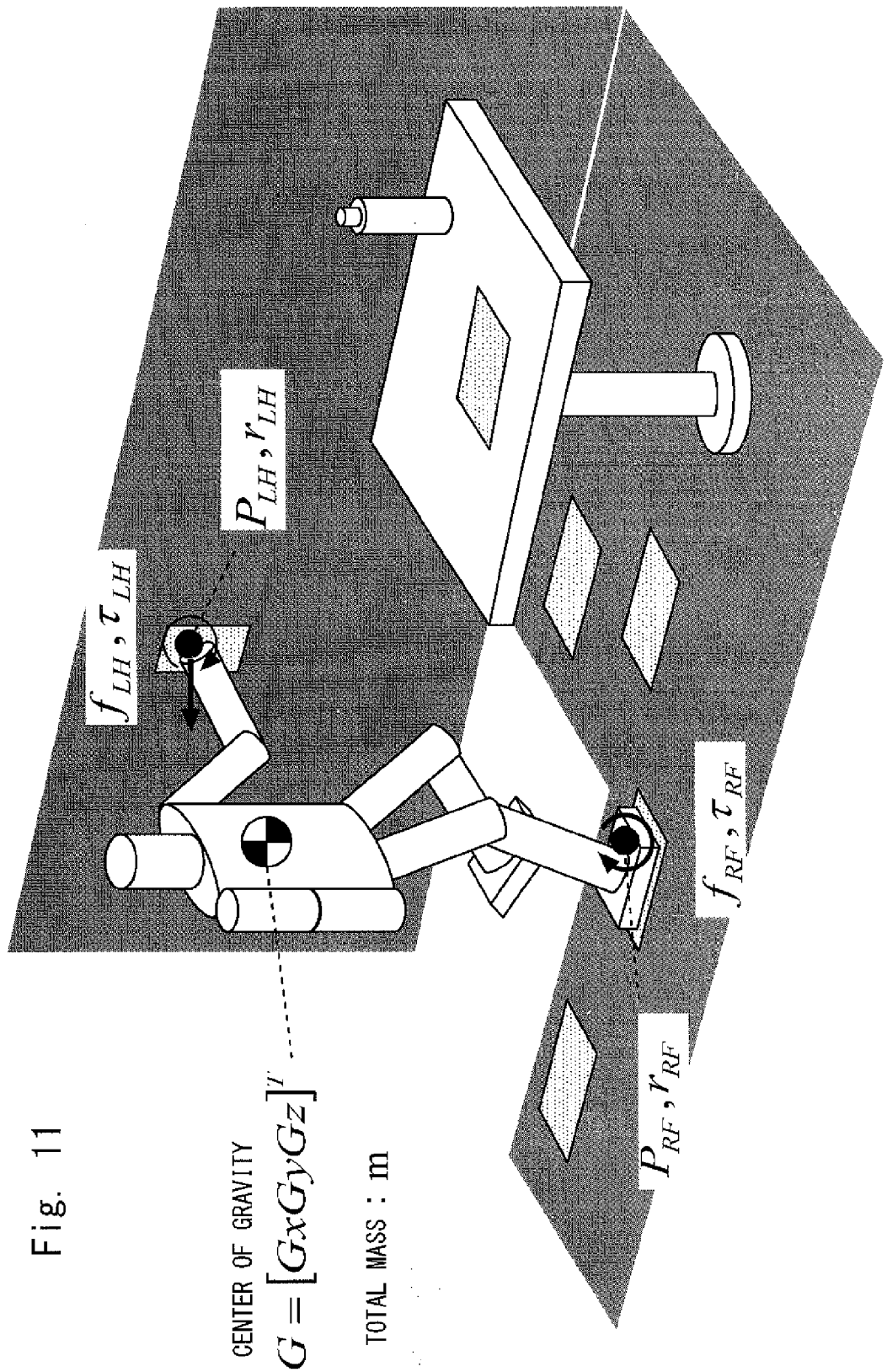
FIG. 11 is a view showing a mobile robot model used for prediction.

FIG. 11 shows the mobile robot model used for prediction.

The inertia of the entire mobile robot is represented by a center of gravity G. The six-axis forces are defined for each contact point.

In this case, assuming that the amount of translational motion at the center of gravity G is represented by P; the amount of rotational motion (amount of angular motion) around the center of gravity is represented by L; and the number of contact points is represented by n, the following motion equations are obtained.

$$\dot{P} = m\ddot{G} = \sum_{i=1}^{n} f_i - mg \quad (1)$$

$$\dot{L} = \sum_{i=1}^{n} (p_i - G) \times f_i + \tau_i$$

The suffix i represents the index of a contact point.

For example, when there are four candidates for the contact point, i.e., the left hand, the right hand, the left foot, and the right foot, n=4 (left hand: LH=1, right hand: RH=2, left foot: LF=3, right foot: RF=4) may be set. In this case, however, a constraint condition is set in such a manner that the contact forces associated with the contact point candidates that are not in contact with the floor and the wall are set to 0. For example, in the example shown in FIG. 11, the following expression is established.

$$f_{RH}=0, \tau_{RH}=0$$

$$f_{LF}=0, \tau_{LF}=0 \quad (2)$$

When the first expression and the second expression in Expression (1) are differentiated, the following expression is obtained. (Expression (1) is represented by vectors. The vectors are decomposed into components x, y, and z, and are respectively referred to as a first expression, a second expression, . . . , and a sixth expression).

$$\dddot{G}_x = \frac{1}{m}\sum_{i=1}^{n} \dot{f}_{ix} \quad (3)$$

$$\dddot{G}_y = \frac{1}{m}\sum_{i=1}^{n} \dot{f}_{iy}$$

In this exemplary embodiment, the two expressions are used as a system. The third to fifth expressions in Expression (1) are formulated as constraint conditions.

$$m\ddot{G}_z = \sum_{i=1}^{n} f_{iz} - mg \quad (4)$$

$$\dot{L}_x = \sum_{i=1}^{n} ((p_{iy} - G_y)f_{iz} - (p_{iz} - G_z)f_{iy} + \tau_{ix})$$

$$\dot{L}_y = \sum_{i=1}^{n} ((p_{iz} - G_z)f_{ix} - (p_{ix} - G_x)f_{iz} + \tau_{iy})$$

Figure 12:
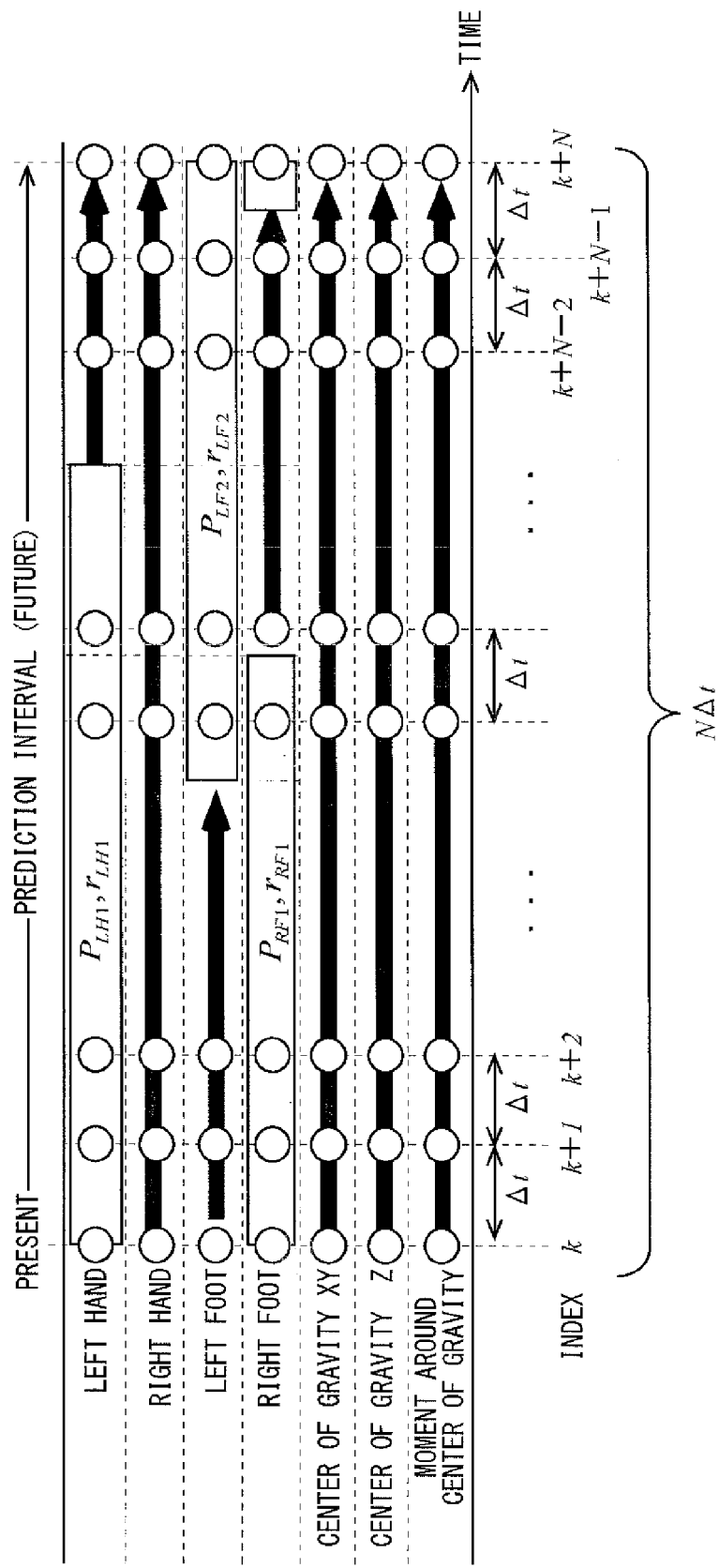
FIG. 12 is a diagram for explaining discretization of the prediction interval.

Further, the prediction interval is divided into N intervals as shown in FIG. 12, and Expression (3) and Expression (4) are discretized. When Expression (3) is discretized, the following expression is obtained.

$$G_x[j+1]=G_x[j]+\dot{G}_x[j]\Delta t+\Sigma f_{ix}[j]\Delta t^2/2m+\Sigma \dot{f}_{ix}[j]\Delta t^3/6\,m$$

$$G_y[j+1]=G_y[j]+\dot{G}_y[j]\Delta t+\Sigma f_{iy}[j]\Delta t^2/2m+\Sigma \dot{f}_{iy}[j]\Delta t^3/6\,m$$

$$\dot{G}_y[j+1]=\dot{G}_y[j]+\Sigma f_{iy}[j]\Delta t/m+\Sigma \dot{f}_{iy}[j]\Delta t^2/2\,m$$

$$f_i[j+1]=f_i[j]+\dot{f}_i[j]\Delta t\,(i=1,\ldots n)$$

$$\tau_i[j+1]=\tau_i[j]+\dot{\tau}_i[j]\Delta t\,(i=1,\ldots n) \quad (5)$$

Assuming that the constraints in Expression (4) are constantly satisfied in each sampling point, Expression (4) is discretized as follows.

$$F_{Gz}[j]:=m(\ddot{G}_z[j]+g)=\Sigma f_{iz}[j]$$

$$\dot{L}_x[j]=-F_z[j]G_y[j]+\Sigma(p_{iy}[j]f_{iz}[j]-(p_{iz}[j]-G_z[j])f_{iy}[j]+\tau_{ix}[j])$$

$$\dot{L}_y[j]=F_z[j]G_x[j]+\Sigma(p_{iz}[j]-G_z[j])f_{ix}[j]-p_{ix}[j]f_{iz}[j]+\tau_{iy}[j]) \quad (6)$$

In this case, the parameters are set as follows.

$$\theta_i[j] := [\ f_{ix}[j]\ \ f_{iy}[j]\ \ f_{iz}[j]\ \ \tau_{ix}[j]\ \ \tau_{iy}[j]\ \ \tau_{iz}[j]\ ]^T \quad (7)$$
$$:= [\ f_i[j]^T\ \ \tau_i[j]^T\ ]^T$$
$$x[j] := [\ G_x[j]\ \ \dot{G}_x[j]\ \ G_y[j]\ \ \dot{G}_y[j]\ \ \theta_1[j]^T\ \ldots\ \theta_n[j]^T\ ]^T$$
$$u[j] := [\ \dot{\theta}_1[j]^T\ \ldots\ \dot{\theta}_n[j]^T\ ]$$

$\theta_i$ represents a vector in which the contact forces, which are the six-axis forces, are arranged. x represents a vector in which the x-coordinate of the center of gravity G, the velocity in the x-axis direction of the center of gravity G, the y-coordinate of the center of gravity G, the velocity in the y-axis direction of the center of gravity G, and the contact forces (six-axis forces) at each contact point are arranged. The vector "x" is referred to as a state variable. Further, u represents a vector in which the differential values of the contact forces (six-axis forces) are arranged.

When the parameters are set as described above, Expression (5) can be described as follows.

$$x[j+1] = Ax[j] + Bu[j] \quad (8)$$

$$A := \begin{bmatrix} A_0 & A_f & \ldots & A_f \\ O & I & \ldots & O \\ \vdots & \vdots & \ddots & \\ O & O & & I \end{bmatrix}$$

$$B := \begin{bmatrix} B_f & \ldots & B_f \\ I\Delta t & \ldots & O \\ \vdots & & \ddots \\ O & & I\Delta t \end{bmatrix}$$

$$A_0 := \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix}$$

$$A_f := \begin{bmatrix} \Delta t^2/2m & 0 & 0 & 0 & 0 & 0 \\ \Delta t/m & 0 & 0 & 0 & 0 & 0 \\ 0 & \Delta t^2/2m & 0 & 0 & 0 & 0 \\ 0 & \Delta t/m & 0 & 0 & 0 & 0 \end{bmatrix}$$

$$B_f := \begin{bmatrix} \Delta t^3/6m & 0 & 0 & 0 & 0 & 0 \\ \Delta t^2/2m & 0 & 0 & 0 & 0 & 0 \\ 0 & \Delta t^3/6m & 0 & 0 & 0 & 0 \\ 0 & \Delta t^2/2m & 0 & 0 & 0 & 0 \end{bmatrix}$$

Expression (8) indicates that the stable variable x in the case of (j+1) can be described by the previous state. When the stable variables x within the prediction interval are sequentially calculated by using Expression (8), the following expression is obtained.

$$x[k+1] = Ax[k] + Bu[k] \quad (9)$$
$$x[k+2] = Ax[k+1] + Bu[k+1]$$
$$= A(Ax[k] + Bu[k]) + Bu[k+1]$$
$$= A^2 x[k] + ABu[k] + Bu[k+1]$$
$$x[k+3] = Ax[k+2] + Bu[k+2]$$
$$= A(A^2 x[k] + ABu[k] + Bu[k+1]) + Bu[k+2]$$
$$= A^3 x[k] + A^2 Bu[k] + ABu[k+1] + Bu[k+2]$$
$$\vdots$$
$$x[k+N] = Ax[k+N-1] + Bu[k+N-1] =$$
$$A^N x[k] + A^{N-1} Bu[k] \ldots + ABu[k+N-2] + Bu[k+N-1]$$

Accordingly, when the arrangement of the stable variables x which are obtained in chronological order is represented by the capital "X", the time-series data X on the stable variables can be expressed as follows.

$$X[k+1] := \begin{bmatrix} x[k+1] \\ x[k+2] \\ \vdots \\ x[k+N-1] \\ x[k+N] \end{bmatrix} \quad (10)$$

$$= \begin{bmatrix} A \\ A^2 \\ \vdots \\ A^{N-1} \\ A^N \end{bmatrix} x[k] + \begin{bmatrix} B & & & \\ AB & B & & \\ \vdots & & \ddots & \\ A^{N-2}B & & & B \\ A^{N-1}B & & \ldots & AB & B \end{bmatrix} \begin{bmatrix} u[k] \\ u[k+1] \\ \vdots \\ u[k+N-2] \\ u[k+N-1] \end{bmatrix}$$

$$:= G_1 x[k] + G_2 U[k]$$

Expression (10) indicates a prediction model that represents a state transition of the mobile robot within a certain prediction interval by using the differential value (U[k]) of the contact force as an input value.

Here, the present inventors have introduced the following evaluation function J so as to generate a stable trajectory within the prediction interval.

$$\min J = \int_0^{N\Delta t} \frac{1}{2} \sum_{i=1}^n \left( \theta_i^T Q_i \theta_i + \dot{\theta}_i^T R_i \dot{\theta}_i \right) dt \quad (11)$$

$$Q_i = \text{diag}(Q_1^i, \ldots, Q_6^i)$$

$$R_i = \text{diag}(R_1^i, \ldots, R_6^i)$$

Note that $Q_i$ and $R_i$ each represent a weight that is set as necessary.

The meaning of the weight and how to distribute the weight to the contact point candidates will be described in detail later. In this case, assume that, for example, the forces are distributed equally to all contact point candidates; all values $Q_i$ are set to 1; and all values $R_i$ satisfy $1 \times 10^{-6}$.

In this case, $\theta_i$ represents the vector in which the components of the contact forces, which are the six-axis forces, are arranged, and $\dot{\theta}_i(\cdot)$ represents the vector in which the differential values of the contact force components are arranged (the dot in parentheses represents differentiation). Accordingly, Expression (11) indicates that "the sum of squares of the contact forces (six-axis forces) and the differential values of the contact forces (six-axis forces) is minimized within the prediction interval". The first term in Expression (11) indicates that the sum of squares of the contact forces (six-axis forces) is minimized.

This first term includes the following operations.

(1) The contact forces are distributed equally to each contact point. This provides the effect of moving the center of gravity to as stable a position as possible.

(2) An undesired internal force is canceled out.

(3) The stability of contacting the ground at each contact point is enhanced. This provides the effect of setting a reaction force center point within a contact surface at the center of the contact surface.

The second term in Expression (11) indicates that the sum of squares of the differential values (time change ratio of six-axis forces) of the contact forces (six-axis forces) is minimized.

This second term includes the following operations.

(1) The divergence of the center of gravity is suppressed.

(2) The contact forces are smoothly shifted.

To minimize the evaluation function J by appropriately adding these operations by weights Q and R indicates that "a stable center-of-gravity trajectory and contact forces at each contact point are output, while the conditions, such as high contact stability, smooth transition of contact forces, and minimum internal force, are satisfied".

When Expression (11) is discretized, the following expression is obtained.

$$\min J = \frac{1}{2} \sum_{j=1}^{N-1} \sum_{i=1}^{n} \left( \theta_i[k+j+1]^T Q_i \theta_i[k+j+1] + \dot{\theta}_i[k+j]^T R_i \dot{\theta}_i[k+j] \right) \quad (12)$$

Since the contact forces (six-axis forces) are included in the state variables x, Expression (7) can be transformed as follows.

$$\begin{bmatrix} \theta_i[k+j+1] \\ \vdots \\ \theta_n[k+j+1] \end{bmatrix} = \begin{bmatrix} O_{6\times 4} & I_6 & & \\ & & \ddots & \\ & & & I_6 \end{bmatrix} x[k+j+1] \quad (13)$$

$$:= T_f x[k+j+1]$$

Accordingly, the first sigma in Expression (12) can be calculated as follows.

$$\sum_{i=1}^{n} \left( \theta_i[k+j+1]^T Q_i \theta_i[k+j+1] + \dot{\theta}_i[k+j]^T R_i \dot{\theta}_i[k+j] \right) = \quad (14)$$

$$(T_f x[k+j+1])^T \begin{bmatrix} Q_1 & & \\ & \ddots & \\ & & Q_n \end{bmatrix} (T_f x[k+j+1]) +$$

$$u[k+j]^T \begin{bmatrix} R_1 & & \\ & \ddots & \\ & & R_n \end{bmatrix} u[k+j] :=$$

$$x[k+j+1]^T Q_a x[k+j+1] + u[k+j]^T R_a u[k+j]$$

$$Q_a := T_f^T \mathrm{diag}(Q_1, \ldots, Q_n) T_f$$

$$R_a := \mathrm{diag}(R_1, \ldots, R_n)$$

Accordingly, Expression (12) can be expressed as follows.

$$J = \frac{1}{2} \sum_{j=1}^{N-1} (x[k+j+1]^T Q_a x[k+j+1] + u[k+j]^T R_a u[k+j]) \quad (15)$$

$$= \frac{1}{2} X[k+1]^T \begin{bmatrix} Q_a & & \\ & \ddots & \\ & & Q_a \end{bmatrix} X[k+1] + \frac{1}{2} U[k]^T \begin{bmatrix} R_a & & \\ & \ddots & \\ & & R_a \end{bmatrix} U[k]$$

$$= \frac{1}{2} X[k+1]^T Q_w X[k+1] + \frac{1}{2} U[k]^T R_w U[k]$$

$$Q_w := \mathrm{diag}(Q_a, \ldots, Q_a)$$

$$R_w := \mathrm{diag}(R_a, \ldots, R_a)$$

Further, the evaluation function J can be formulated as follows by using Expression (10).

$$J = \frac{1}{2} X[k+1]^T Q_w X[k+1] + \frac{1}{2} U[k]^T R_w U[k] \quad (16)$$

$$= \frac{1}{2} (G_1 x[k] + G_2 U[k])^T Q_w (G_1 x[k] + G_2 U[k]) + \frac{1}{2} U[k]^T R_w U[k]$$

$$= \frac{1}{2} U[k]^T (G_2^T Q_w G_2 + R_w) U[k] + (G_2^T Q_w G_1 x[k])^T U[k]$$

$$:= \frac{1}{2} U[k]^T H U[k] + F^T U[k] + \mathrm{const}$$

Next, the constraint conditions are considered.

It is necessary to satisfy the following constraint conditions in all sampling points within the prediction interval.

The constraint conditions are as follows:

a constraint that the six-axis forces are set to 0 for non-contact contact point candidates as shown in Expression (2);

a constraint that the forces in the vertical direction as shown in Expression (6) are balanced; and a constraint that the moments around the xy axes as shown in Expression (6) are balanced.

In this case, for example, assume that an i-th contact point and an (i+2)-th contact point are non-contact points in a sampling point j.

At this time, Expression (2) and Expression (6) can be described as follows.

$$C[j] x[j] = d[j] \quad (17)$$

$$C[j] := \begin{bmatrix} C_0[j] & C_1[j] & \ldots & O & C_{i+1}[j] & O & \ldots & C_n[j] \\ O & O & \ldots & I & O & O & \ldots & O \\ O & O & \ldots & O & O & I & \ldots & O \end{bmatrix}$$

$$d[j] := \begin{bmatrix} d_0[j] \\ O \\ O \end{bmatrix}$$

$$C_0[j] := \begin{bmatrix} 0 & 0 & 0 & 0 \\ 0 & 0 & -m(\ddot{G}_z[j]+g) & 0 \\ m(\ddot{G}_z[j]+g) & 0 & 0 & 0 \end{bmatrix}$$

-continued $$C_i[j] := \begin{bmatrix} 0 & 0 & 1 & 0 & 0 & 0 \\ 0 & -(p_{iz}[j] - G_z[j]) & p_{iy}[j] & 1 & 0 & 0 \\ p_{iz}[j] - G_z[j] & 0 & -p_{ix}[j] & 0 & 1 & 0 \end{bmatrix}$$

$$d_0[j] := \begin{bmatrix} m(\ddot{G}_z[j] + g) \\ \dot{L}_x[j] \\ \dot{L}_y[j] \end{bmatrix}$$

Here, the components of the coefficient matrices C[j] and d[j] vary depending on the sampling point. However, the information on contact/non-contact of the contact point candidates and the contact point positions are already given.

The center-of-gravity vertical trajectory (Gz[j]) and the moments (Lx(·)[j], Ly(·)[j]) around the center of gravity, which will be described in detail later, are briefly described as follows.

If the center-of-gravity vertical trajectory and the moment around the center of gravity are not determined, temporary values are set and used. For example, the center-of-gravity vertical trajectory and the moment around the center of gravity which are used in the previous control cycle may be used as temporary values.

Alternatively, the center-of-gravity vertical trajectory and the moment around the center of gravity may be temporarily set in such a manner that they are not moved from the current state within the prediction interval.

Then the calculations are performed one time by using the temporary values, and the obtained results are used to update the center-of-gravity vertical trajectory and the moment around the center of gravity, and solutions are repeatedly obtained.

In this manner, the center-of-gravity vertical trajectory and the moment around the center of gravity are also used as known values to proceed with the calculations, and a deviation is corrected in the update calculation.

It is necessity to satisfy the following expression so that Expression (17) holds in all future sampling points.

$$\begin{bmatrix} C[k+1] & & & \\ & C[k+2] & & \\ & & \ddots & \\ & & & C[k+N] \end{bmatrix} \begin{bmatrix} x[k+1] \\ x[k+2] \\ \vdots \\ x[k+N] \end{bmatrix} = \begin{bmatrix} d[k+1] \\ d[k+2] \\ \vdots \\ d[k+N] \end{bmatrix} \quad (18)$$

Expression (10) is substituted into this expression.

$$\begin{bmatrix} C[k+1]B & & & \\ C[k+2]AB & C[k+2]B & & \\ \vdots & & \ddots & \\ C[k+N]A^{N-1}B & \cdots & C[k+N]AB & C[k+N]B \end{bmatrix} \quad (19)$$

$$U[k] = \begin{bmatrix} d[k+1] \\ d[k+2] \\ \vdots \\ d[k+N] \end{bmatrix} - \begin{bmatrix} C[k+1]A \\ C[k+2]A^2 \\ \vdots \\ C[k+N]A^N \end{bmatrix} x[k] \Leftrightarrow VU[k] = W$$

$$V := \begin{bmatrix} C[k+1]B & & & \\ C[k+2]AB & C[k+2]B & & \\ \vdots & & \ddots & \\ C[k+N]A^{N-1}B & \cdots & C[k+N]AB & C[k+N]B \end{bmatrix}$$

$$W := \begin{bmatrix} d[k+1] \\ d[k+2] \\ \vdots \\ d[k+N] \end{bmatrix} - \begin{bmatrix} C[k+1]A \\ C[k+2]A^2 \\ \vdots \\ C[k+N]A^N \end{bmatrix} x[k]$$

Lastly, the conditions for stabilizing each contact point and maintaining the contact are introduced.

Figure 13:
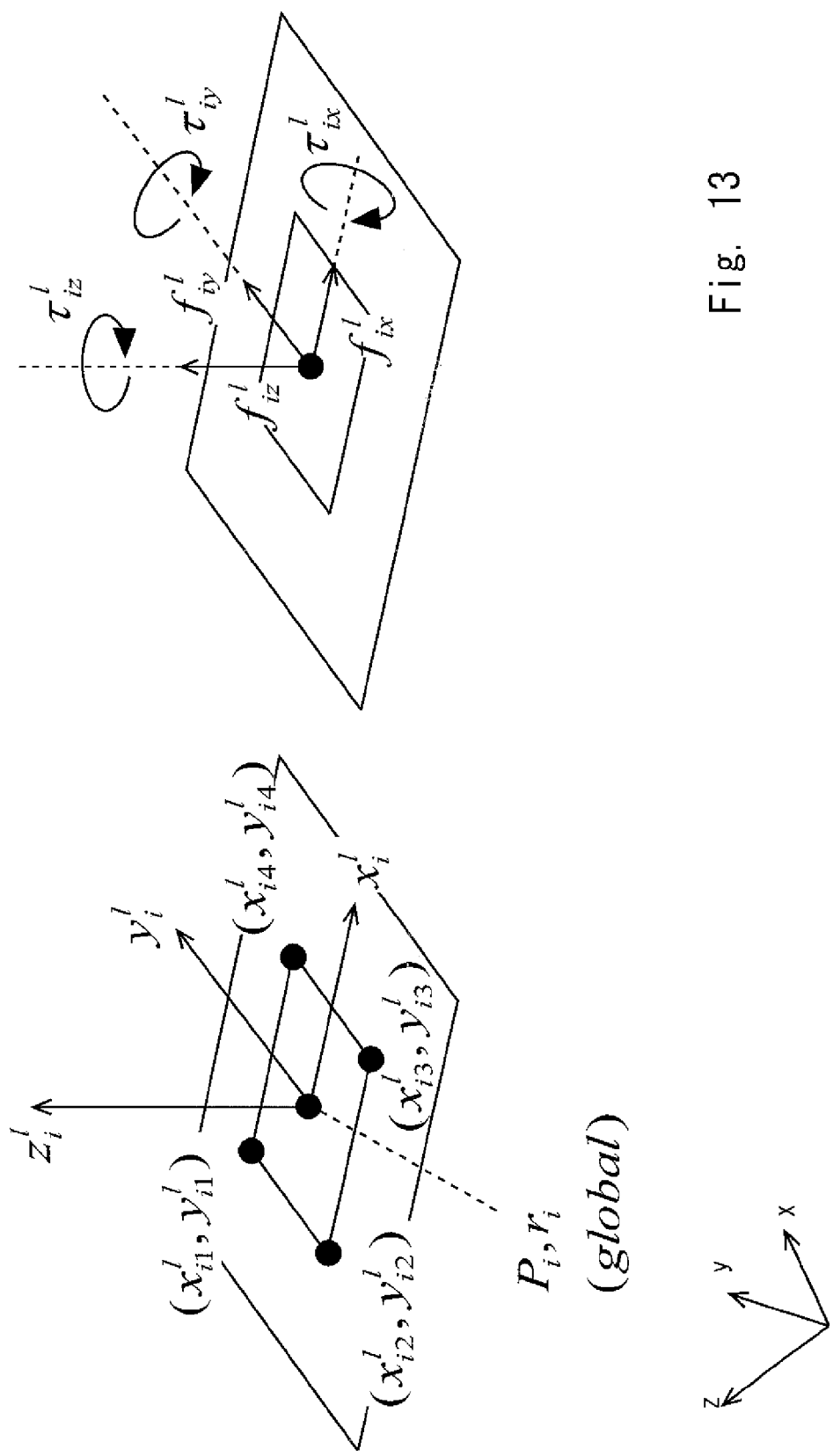
FIG. 13 is a diagram showing coordinate systems for contact points and a contact polygon.

FIG. 13 shows coordinate systems (marked with a superscript letter "l") of contact points and a contact polygon (contact polygon of contact points).

Assume that each contact point is set as an origin and the coordinate system for each contact point is defined according to a posture $r_i$ of the contact surface.

In this case, contact forces (six-axis forces) $\theta_i^l$ defined by the coordinate systems for each contact point are represented as follows.

$$\theta_i^l = [f_{ix}^l, f_{iy}^l, f_{iz}^l, \tau_{ix}^l, \tau_{iy}^l, \tau_{iz}^l]^T$$

Further, the contact forces (six-axis forces) $\theta_i^l$ can be expressed as follows by using a posture matrix $\Phi_i = \mathrm{rot}(r_i)$ of the contact surface.

Note that "rot" represents a function that transforms an Euler angle into a posture matrix.

$$\theta_i^l = \begin{bmatrix} \Phi_i & O \\ O & \Phi_i \end{bmatrix} \theta_i := T_i \theta_i \quad (20)$$

To stabilize the contact points and maintain the contact, it is necessary to satisfy the following three conditions:

(1) to prevent the contact points from being spaced apart from each other;

(2) to prevent the contact points from sliding; and (3) to prevent the contact points from being removed.

For better understanding of the above three requirements, FIG. 14 illustrates the case where the contact points becomes unstable.

(1) To prevent the contact points from being spaced apart from each other, it is only necessary that the vertical force on the contact surface be positive. In other words, it is necessary to satisfy the following expression.

$$f_{iz}^l \geq 0 \quad (21)$$

(2) To prevent the contact points from sliding, it is only necessary that two-axis forces parallel to the contact surface be less than or equal to a frictional force. In other words, it is necessary to satisfy the following expression as a condition. In this case, the friction coefficient of the contact surface is represented by $\mu_i$.

$$-\mu_i f_{iz}^l \leq f_{ix}^l \leq \mu_i f_{iz}^l$$

$$-\mu_i f_{iz}^l \leq f_{iy}^l \leq \mu_i f_{iz}^l \quad (22)$$

(3) The condition of preventing the contact points from being removed is represented as follows by using h vertex coordinates of the contact polygon.

$$(x_{i1}^l, y_{i1}^l), \ldots, \text{and } (x_{ih}^l, y_{ih}^l)$$

(In this case, assume that the vertices of the contact polygon are given in clockwise order).

$$\begin{cases} (x_{i1}^l - x_{i2}^l)\tau_{ix}^l + (y_{i1}^l - y_{i2}^l)\tau_{iy}^l \le (x_{i1}^l y_{i2}^l - x_{i2}^l y_{i1}^l)f_{iz}^l \\ \vdots \\ (x_{ih}^l - x_{i1}^l)\tau_{ix}^l + (y_{ih}^l - y_{i1}^l)\tau_{iy}^l \le (x_{ih}^l y_{i1}^l - x_{i1}^l y_{ih}^l)f_{iz}^l \end{cases} \quad (23)$$

The above Expressions (21), (22), and (23) can be summarized as follows.

$$\begin{bmatrix} 0 & 0 & -1 & 0 & 0 & 0 \\ 1 & 0 & -\mu_i & 0 & 0 & 0 \\ -1 & 0 & -\mu_i & 0 & 0 & 0 \\ 0 & 1 & -\mu_i & 0 & 0 & 0 \\ 0 & -1 & -\mu_i & 0 & 0 & 0 \\ 0 & 0 & x_{i2}^l y_{i1}^l - x_{i1}^l y_{i2}^l & x_{i1}^l - x_{i2}^l & y_{i1}^l - y_{i2}^l & 0 \\ & & \vdots & & & \\ 0 & 0 & x_{i1}^l y_{ih}^l - x_{ih}^l y_{i1}^l & x_{ih}^l - x_{i1}^l & y_{ih}^l - y_{i1}^l & 0 \end{bmatrix} \theta_i^l \le O \Leftrightarrow \Gamma_i \theta_i^l \le O \quad (24)$$

Expression (20) is substituted into Expression (24) and is indexed as the j-th sampling point.

$$\Gamma_i[j]T_i[j]f_i[j] \le O \Leftrightarrow E_i[j]\theta_i[j] \le O$$

$$E_i[j] := \Gamma_i[j]T_i[j] \quad (25)$$

Expression (25) represents the condition that should be satisfied to maintain a stable contact of the i-th contact point in the j-th sampling point. To achieve a stable multipoint contact operation, it is necessary to satisfy Expression (25) at all contact points in all the sampling points.

First, the condition that all contact points satisfy Expression (25) in the j-th sampling point can be described as follows.

$$\begin{bmatrix} E_1[j]\theta_1[j] \\ E_2[j]\theta_2[j] \\ \vdots \\ E_n[j]\theta_n[j] \end{bmatrix} \le O \Leftrightarrow \begin{bmatrix} O & E_1[j] & & & \\ & & E_2[j] & & \\ & & & \ddots & \\ & & & & E_M[j] \end{bmatrix} x[j] \le O \Leftrightarrow \quad (26)$$

$$E_a[j]x[j] \le O$$

The condition satisfied at all sampling points can be described as follows.

$$\begin{bmatrix} E_a[k+1]x[k+1] \\ \vdots \\ E_a[k+N]x[k+N] \end{bmatrix} \le O \Leftrightarrow \begin{bmatrix} E_a[k+1] & & \\ & \ddots & \\ & & E_a[k+N] \end{bmatrix} X[k+1] \le \quad (27)$$

$$O \Leftrightarrow E_w X[k+1] \le O$$

Expression (10) is substituted into this expression.

$$E_w(G_1 x[k] + G_2 U[k]) \le O \Leftrightarrow \quad (28)$$

$$E_w G_2 U[k] \le -E_w G_1 x[k] \Leftrightarrow PU[k] \le S$$

$$P := E_w G_2$$

$$S := -E_w G_1 x[k]$$

-continued $$E_w := \begin{bmatrix} E_a[k+1] & & \\ & \ddots & \\ & & E_a[k+N] \end{bmatrix}$$

$$E_a[j] := \begin{bmatrix} O & E_1[j] & & & \\ & & E_2[j] & & \\ & & & \ddots & \\ & & & & E_M[j] \end{bmatrix}$$

Lastly, the problem of stable trajectory generation during multipoint contact can be reduced to the following convex quadratic programming problem by Expressions (16), (19), and (28).

$$\min_U \frac{1}{2} U^T H U + F^T U \quad (29)$$

$$\text{s.t.} \quad PU \le S$$

$$VU = W$$

If the problem can be reduced to the convex quadratic programming problem (Quadratic Programming: QP), a solution to the convex quadratic programming problem (QP), which is one of the well-known optimization problems, can be rapidly obtained. (After the solution is obtained, U[k] can be obtained).

After the solution to the QP is obtained, the center-of-gravity trajectory and the contact forces at each contact point can be calculated as follows.

$$X_{out}[k+1] := G_1 x[k] + G_2 U[k] \quad (30)$$

In this manner, X[k+1] which constantly satisfies the constraint conditions (1) to (3) in the prediction interval and minimizes the evaluation function J is obtained.

As is seen from Expressions (7) and (10), X[k+1] represents time-series data on the x-coordinate of the center of gravity, the velocity in the x-axis direction of the center of gravity, the y-coordinate of the center of gravity, the velocity in the y-axis direction of the center of gravity, and the contact forces (six-axis forces) at each contact point.

As described above in the process of expanding the expressions, the center-of-gravity vertical trajectory (z-coordinate) and the moment around the center of gravity, which are corrected in the update calculation, are obtained (which will be described later). That is, the trajectory that achieves a stable movement within the prediction interval can be obtained.

In order to avoid confusion regarding the terms used herein, the terms are explained in more detail below.

As is apparent from the above arithmetic operation process and the results obtained from the above arithmetic operation, the term "trajectory" herein described can be more easily understood if the time-series data on the contact forces (six-axis forces) generated at each contact point, as well as the three-dimensional trajectory of the center of gravity, is taken into consideration.

The concept "trajectory" that allows the mobile robot to move generally includes trajectories of hands and feet, but the "trajectory" used in the above description may include or may not include trajectories of hands and feet.

Based on the premise that the hands and feet are placed according to the contact-point planning, the trajectories of the hands and feet can be substantially automatically determined by interpolation from the time-series data on the contact-point planning, the center-of-gravity trajectory, and the contact forces.

(However, as described later, when the case of changing the contact points is taken into consideration, the trajectories of the hands and feet are also important.)

(Relaxation of Constraints)

The above description is based on the premise that the hands and feet are placed according to the contact-point planning. However, if there are various disturbances, there may be situations where a stable trajectory for the robot cannot be determined merely by placing the hands and feet according to the contact-point planning. For example, assume that a large disturbance is input when, for example, the robot is pressed hard from the back side. Thus, the center of gravity of the robot has a large velocity corresponding to the amount of pressure applied from the back side. Assuming the case where the trajectory is obtained by a model prediction control from the state in which a large velocity is generated at the center of gravity of the robot as described above, that is, assuming the case where Expression (29) is solved to obtain a solution as shown in Expression (30), the contact forces that can be generated at each contact point are not sufficient to stop the robot, which results in a situation in which the trajectory diverges.

For example, the case of a bipedal robot is considered. If the posture of the upper body of the robot is inclined forward when the robot is pressed hard from the back side, it is necessary to prevent the robot from stepping forward to a larger extent than an assumed landing point of an idling leg and thereby prevent the upper body of the robot from falling forward. If the hands and feet are placed as planned, it is difficult to prevent the upper body from falling forward, with the result that robot is further inclined forward and falls down. (In the case of trying to obtain a solution so as to prevent the robot from falling down without changing the planned landing point, it is necessary to generate an excessive contact force on each contact point (sole) and drive each joint with an extremely large force. However, this is impossible.) This indicates a state in which when a large velocity is generated at the center of gravity due to a disturbance, the trajectory cannot be physically stabilized at the contact position of the future planned contact point.

Incidentally, the dynamics in Expression (1) represent the equation of equilibrium for the force related to the center of gravity and the equation of equilibrium for the moment. However, if the equation of equilibrium for the moment is neglected, "divergence" does not occur. For example, assuming the situation in which the robot is in contact with the ground at one point (that is, the situation in which the robot is standing on one leg), the robot has the dynamics of an inverted pendulum. Accordingly, when a large external force with which the robot cannot manage to stay on its foot sole acts on the robot, the center of gravity diverges. However, if the equation of equilibrium for the moment is neglected, the robot has the dynamics of only the equation of equilibrium for the force (relational expression between the force and the acceleration), so that the "divergence" does not occur. That is, it can be considered that the dynamics of an inverted pendulum are generated when the equation of equilibrium for the moment is added to the equation of equilibrium for the force.

Accordingly, the equation of equilibrium for the moment is allowed to break down by introducing slack variables. Specifically, in the constraint condition of Expression (17), slack terms $\epsilon_x$ and $\epsilon_y$ are introduced into the equation of equilibrium for the moment, thereby allowing the equation of equilibrium for the moment to break down.

$$C[j]x[j] = d[j] \tag{31}$$

$$C[j] := \begin{bmatrix} C_0[j] & C_1[j] & \cdots & O & C_{i+1}[j] & O & \cdots & C_n[j] \\ O & O & \cdots & I & O & O & \cdots & O \\ O & O & \cdots & O & O & I & \cdots & O \end{bmatrix}$$

$$d[j] := \begin{bmatrix} d_a[j] \\ O \\ O \end{bmatrix}$$

$$C_0[j] := \begin{bmatrix} 0 & 0 & 0 & 0 \\ 0 & 0 & -m(\ddot{z}_g[j] + g) & 0 \\ m(\ddot{z}_g[j] + g) & 0 & 0 & 0 \end{bmatrix}$$

$$C_i[j] := \begin{bmatrix} 0 & 0 & 1 & 0 & 0 & 0 \\ 0 & -(p_{iz}[j] - z_g[j]) & p_{iy}[j] & 1 & 0 & 0 \\ p_{iz}[j] - z_g[j] & 0 & -p_{ix}[j] & 0 & 1 & 0 \end{bmatrix}$$

$$d_a[j] := \begin{bmatrix} m(\ddot{z}_g[j] + g) \\ \dot{L}_x[j] + \varepsilon_x \\ \dot{L}_y[j] + \varepsilon_y \end{bmatrix}$$

This slack term is introduced into the evaluation function (Expression (12)).

$$\min J_1 = \tag{32}$$

$$\frac{1}{2}\sum_{j=1}^{N-1}\sum_{i=1}^{n} \left(\theta_i[k+j+1]^T Q_i \theta_i[k+j+1] + \dot{\theta}_i[k+j]^T R_i \dot{\theta}_i[k+j]\right) +$$

$$\rho(|\varepsilon_x| + |\varepsilon_y|)$$

The slack variable term ($\rho(|\epsilon x|+|\epsilon y|)$) in Expression (32) is added to the evaluation function by placing absolute-value signs around the slack variables. This indicates that the slack variables are set as close to 0 as possible. $\rho$ represents a weight to be multiplied by each slack variable.

When the center of gravity begins to diverge, the acceleration and jerk at the center of gravity increase sharply, so that the first term and the second term in Expression (32) increase sharply. When the equation of equilibrium for the moment is allowed to break down by increasing the slack variables, the divergence is suppressed, and thus the increase in the first term and the second term in Expression (32) is suppressed. However, as a matter of course, the value of the slack variable term increases.

To better understand Expressions (32) and (31), the meaning of the expressions is briefly explained below.

As shown in Expression (32), the slack term is placed outside the double sigma notation.

This conceptually indicates that the solution to the state in which the robot is slightly inclined during the entire prediction interval is allowed when the equation of equilibrium for the moment breaks down in the prediction interval and the center-of-gravity trajectory diverges. (In this case, however, the generation of slack variables is sometimes allowed and sometimes not allowed in the prediction interval. This will be described later.)

The degree at which the generation of slack variables is allowed is determined by the ratio (balance) between the weights Q and R and the slack variable weight $\rho$. By appropriately setting the balance of the weights (Q, R, $\rho$), the following function can be achieved. That is, the slack variables ($\epsilon x$, $\epsilon y$) remain 0 when the trajectory does not diverge, and necessary and sufficient slack variables are generated only when the trajectory diverges. As described later, "the slack variable value is nearly equal to the amount of change in position of the contact point". Accordingly, the user can use the slack variable weight $\rho$ to adjust the degree of sensitivity to disturbances in the case of changing the position of the contact point.

Now, the convex quadratic programming problem is derived by using Expressions (31) and (32).

The slack terms $\epsilon_x$ and $\epsilon_y$ are substituted as follows so as to remove the absolute value notation.

$$\begin{cases} \varepsilon_x := \varepsilon_{x1} - \varepsilon_{x2} \\ \varepsilon_y := \varepsilon_{y1} - \varepsilon_{y2} \end{cases} \quad (33)$$

$$\varepsilon_{x1} \geq 0, \varepsilon_{x2} \geq 0$$

$$\varepsilon_{y1} \geq 0, \varepsilon_{y2} \geq 0$$

Further, an input vector U is expanded as follows. That is, the slack variables are introduced into the input vector U.

$$U[k] := \begin{bmatrix} u[k] \\ u[k+1] \\ \vdots \\ u[k+N-2] \\ u[k+N-1] \end{bmatrix} \rightarrow U_\varepsilon[k] := \begin{bmatrix} u[k] \\ u[k+1] \\ \vdots \\ u[k+N-2] \\ u[k+N-1] \\ \varepsilon \end{bmatrix} \quad (34)$$

$$\varepsilon := [\varepsilon_{x1} \; \varepsilon_{x2} \; \varepsilon_{y1} \; \varepsilon_{y2}]^T$$

Here, the slack variable terms can be transformed as follows by Expression (33).

$$\min \rho(|\epsilon_x| + |\epsilon_y|) = \min \rho(\epsilon_{x1} + \epsilon_{x2} + \epsilon_{y1} + \epsilon_{y2})$$

$$\epsilon_{x1} \geq 0, \epsilon_{x2} \geq 0 \; \epsilon_{y1} \geq 0, \epsilon_{y2} \geq 0 \quad (35)$$

Accordingly, the evaluation function $J_1$ in Expression (32) is expressed as follows.

$$J_1 = \frac{1}{2} \sum_{j=1}^{N-1} \sum_{i=1}^{n} (\theta_i[k+j+1]^T Q_i \theta_i[k+j+1] + \quad (36)$$

$$\dot{\theta}_i[k+j]^T R_i \dot{\theta}_i[k+j]) +$$

$$\rho(\varepsilon_{x1} + \varepsilon_{x2} + \varepsilon_{y1} + \varepsilon_{y2})$$

$$= \frac{1}{2} \sum_{j=1}^{N-1} (x[k+j+1]^T Q_a x[k+j+1] + u[k+j]^T R_a u[k+j]) +$$

$$[\rho \; \rho \; \rho \; \rho] \varepsilon$$

$$= \frac{1}{2} X[k+1]^T Q_{1v} X[k+1] + \frac{1}{2} U[k]^T R_{1v} U[k] + \rho^T \varepsilon$$

$$= \frac{1}{2} U[k]^T H U[k] + F^T U[k] + \rho^T \varepsilon + \text{const}$$

$$= \frac{1}{2} U_\varepsilon[k]^T \begin{bmatrix} H & O \\ O & O \end{bmatrix} U_\varepsilon[k] + \begin{bmatrix} F \\ \rho \end{bmatrix}^T U_\varepsilon[k] + \text{const}$$

$$\rho := [\rho \; \rho \; \rho \; \rho]^T$$

Further, when the above expression is summarized, the evaluation function $J_1$ is expressed as follows.

$$J_1 := \frac{1}{2} U_\varepsilon[k]^T H_\varepsilon U_\varepsilon[k] + F_\varepsilon^T U_\varepsilon[k] + \text{const} \quad (37)$$

$$H_\varepsilon := \begin{bmatrix} H & O \\ O & O \end{bmatrix} \quad F_\varepsilon := \begin{bmatrix} F \\ \rho \end{bmatrix}$$

Next, the constraint conditions are considered.

The constraint condition (Expression (31)) is rewritten as follows. (The slack term is explicitly expressed, while the slack term is included in d[j] in the above Expression (31).)

$$C[j] x[j] = d[j] + d_\varepsilon \quad (38)$$

$$d[j] := \begin{bmatrix} d_0[j] \\ O \\ O \end{bmatrix}, \quad d_0[j] := \begin{bmatrix} m(\ddot{z}_g[j] + g) \\ \dot{L}_x[j] \\ \dot{L}_y[j] \end{bmatrix}$$

It should be noted here that slack terms cannot always be generated.

In other words, it is necessary to classify the cases. Classifying the cases means that a sub-interval including a contact point whose position can be changed and a sub-interval including no contact point whose position can be changed are distinguished from each other in the prediction interval.

The generation of the slack variables, which are introduced in Expression (31), indicates deviation from the mechanical equation of equilibrium (equation of equilibrium for the moment) to be physically satisfied by the robot.

As described later, when slack variables are generated, it is necessary to cancel the slack terms by changing the contact position and to finally generate the trajectory that generates no slack variables.

Figure 15:
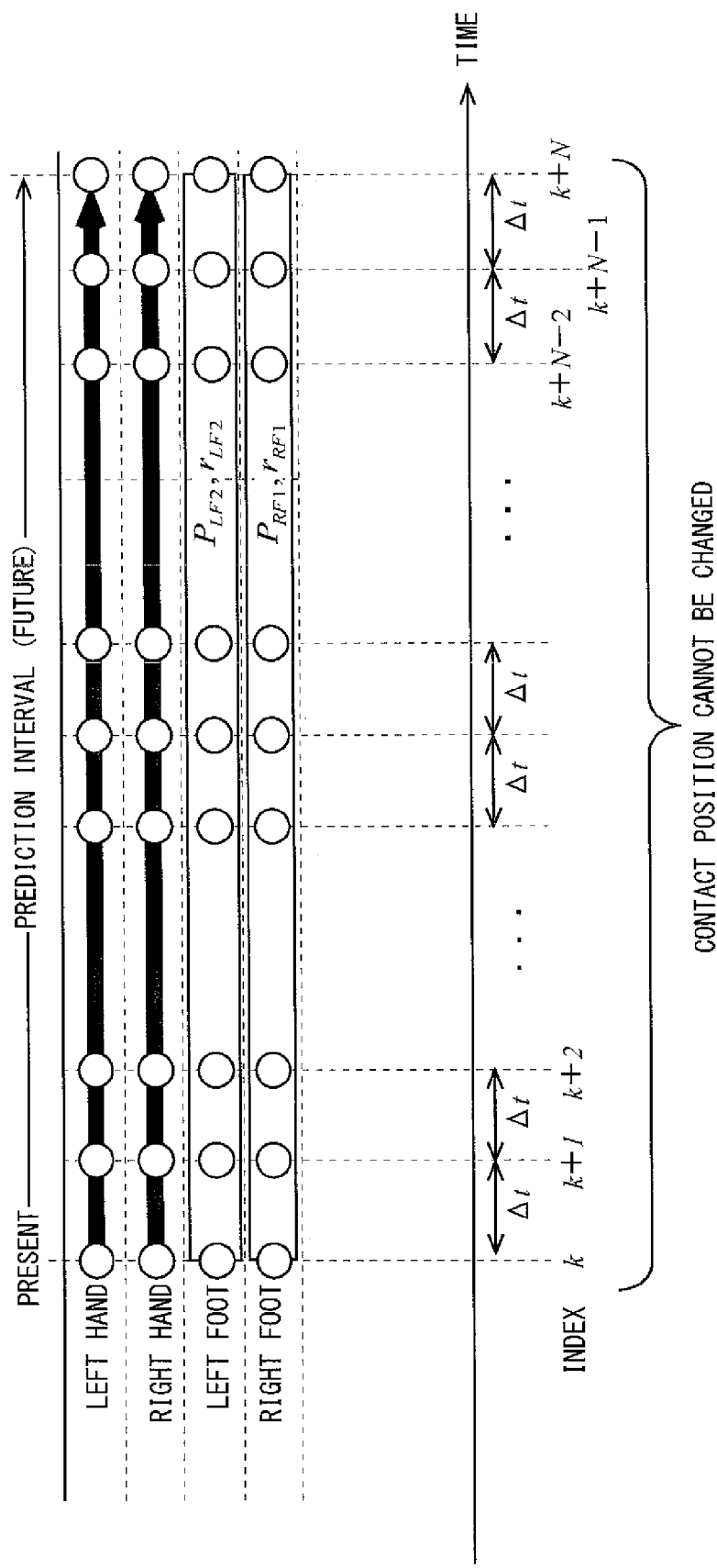
FIG. 15 is a diagram illustrating a case where the positions of the contact points cannot be changed.

In other words, even when the slack terms are generated, the slack terms cannot be compensated by changing the contact position under the situation in which there is no contact point whose position can be changed. Therefore, the constraints should not be relaxed. This can be easily understood by considering the situation in which, for example, the contact-point planning in the prediction interval indicates that the robot remains standing on both feet as shown in FIG. 15. In this situation, it is impossible to stabilize the robot by changing the contact position, and thus the constraints by the slack variables should not be relaxed.

Figure 16:
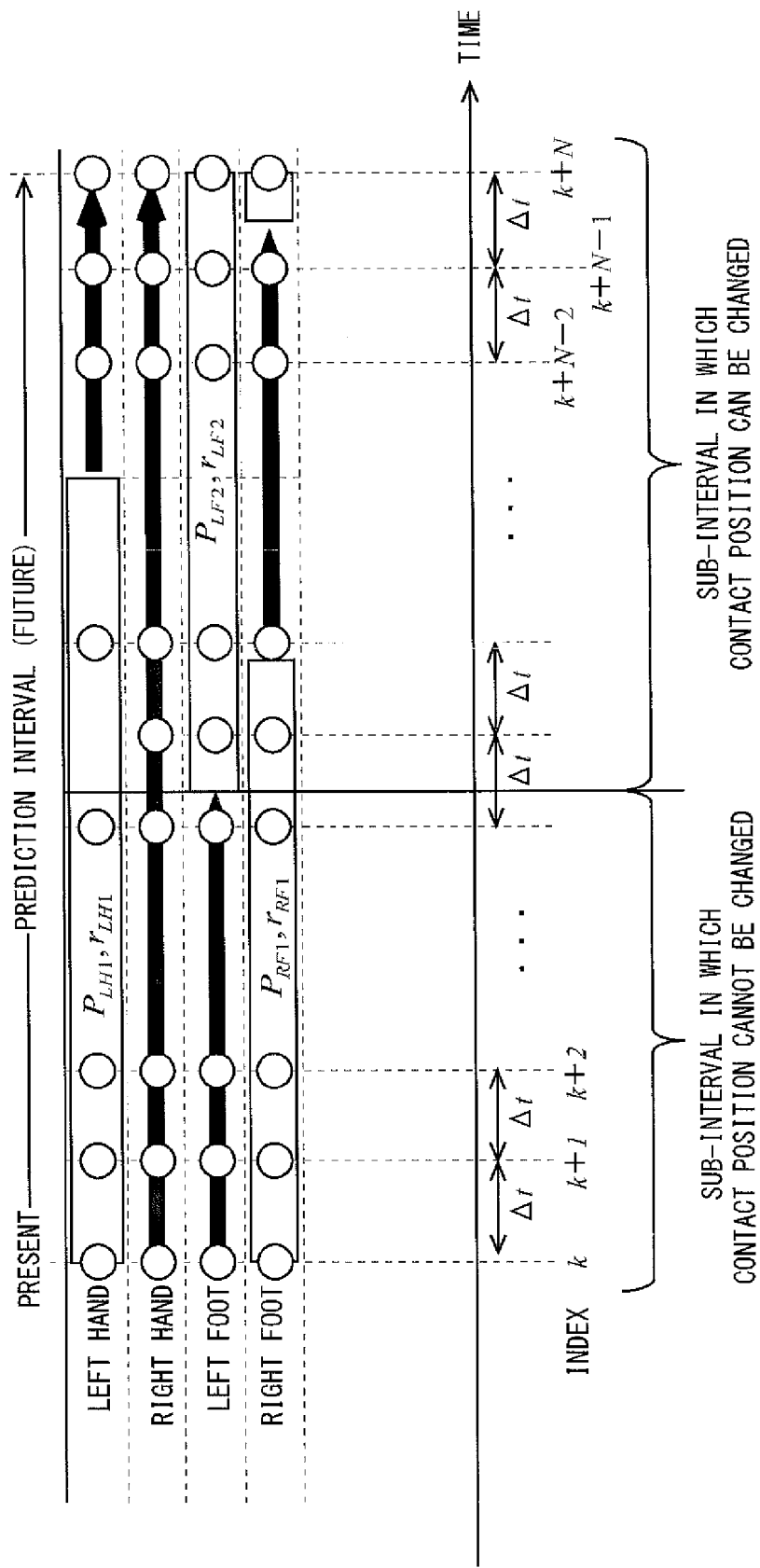
FIG. 16 is a diagram illustrating a case where the positions of the contact points can be changed.

On the other hand, in the situation as shown in FIG. 16, the left foot and the right foot start landing in the middle of the prediction interval. Thus, there is a sub-interval in which the robot can be stabilized by changing the contact positions of the left foot and the right foot. That is, in this sub-interval, the positions of the contact points can be changed so as to cancel the slack terms. Therefore, in the prediction interval shown in FIG. 16, the first half of the prediction interval indicates "the sub-interval including no contact point whose position can be changed", and the interval after the time point when the left foot, which is an idling leg, is landed, indicates "the sub-interval including a contact point whose position can be changed".

If there is at least one contact point whose position can be changed, the interval after the contact point is "the sub-interval including a contact point whose position can be changed".

Accordingly, all slack terms are 0 in "the sub-interval including no contact point whose position can be changed".

In the following description, "the sub-interval including a contact point whose position can be changed" is also referred to as "adjustable sub-interval", and "the sub-interval including no contact point whose position can be changed" is also referred to as "unadjustable sub-interval".

$$d_\varepsilon := \begin{bmatrix} O \\ O \\ O \end{bmatrix} \quad (39)$$

On the other hand, in "the sub-interval including a contact point whose position can be changed" (adjustable sub-interval), slack terms are introduced so that the slack terms can be allowed.

$$d_\varepsilon := \begin{bmatrix} D_\varepsilon \varepsilon \\ O \\ O \end{bmatrix} \quad (40)$$

$$D_\varepsilon \varepsilon = \begin{bmatrix} 0 \\ \varepsilon_{x1} - \varepsilon_{x2} \\ \varepsilon_{y1} - \varepsilon_{y2} \end{bmatrix} = \begin{bmatrix} 0 \\ \varepsilon_x \\ \varepsilon_y \end{bmatrix}$$

$$D_\varepsilon := \begin{bmatrix} 0 & 0 & 0 & 0 \\ 1 & -1 & 0 & 0 \\ 0 & 0 & 1 & -1 \end{bmatrix}$$

$$\varepsilon := \begin{bmatrix} \varepsilon_{x1} & \varepsilon_{x2} & \varepsilon_{y1} & \varepsilon_{y2} \end{bmatrix}^T$$

In this manner, relaxation of the constraints is allowed by using the slack variables only during "the sub-interval including a contact point whose position can be changed" (adjustable sub-interval).

In view of the above, Expression (38) is transformed.

The elements in Expression (38) can be explicitly written as follows.

$$\begin{bmatrix} C[k+1] & & & \\ & C[k+2] & & \\ & & \ddots & \\ & & & C[k+N] \end{bmatrix} \quad (41)$$

$$\begin{bmatrix} x[k+1] \\ x[k+2] \\ \vdots \\ x[k+N] \end{bmatrix} = \begin{bmatrix} d[k+1] \\ d[k+2] \\ \vdots \\ d[k+N] \end{bmatrix} + \begin{bmatrix} d_\varepsilon \\ d_\varepsilon \\ \vdots \\ d_\varepsilon \end{bmatrix}$$

When Expression (10) is substituted into Expression (41) and is transposed and simplified, the following expression is obtained.

$$\begin{bmatrix} C[k+1]B & & & & O \\ C[k+2]AB & C[k+2]B & & & O \\ \vdots & & \ddots & & \vdots \\ C\begin{bmatrix} k+ \\ N-1 \end{bmatrix} A^{N-2}B & & & C\begin{bmatrix} k+ \\ N-1 \end{bmatrix} B & D_\varepsilon \\ C[k+N]A^{N-1}B & \cdots & C\begin{bmatrix} k+ \\ N \end{bmatrix} AB & C\begin{bmatrix} k+ \\ N \end{bmatrix} B & D_\varepsilon \end{bmatrix} U_\varepsilon[k] = \quad (42)$$

$$\begin{bmatrix} d[k+1] \\ d[k+2] \\ \vdots \\ d[k+N-1] \\ d[k+N] \end{bmatrix} - \begin{bmatrix} C[k+1]A \\ C[k+2]A^2 \\ \vdots \\ C[k+N-1]A^{N-1} \\ C[k+N]A^N \end{bmatrix} x[k]$$

$$\Leftrightarrow V_\varepsilon U_\varepsilon[k] = W$$

In this case, $V_\varepsilon$ is expressed as follows.

$$V_\varepsilon := \begin{bmatrix} C[k+1]B & & & & O \\ C[k+2]AB & C[k+2]B & & & O \\ \vdots & & \ddots & & \vdots \\ C\begin{bmatrix} k+N- \\ 1 \end{bmatrix} A^{N-2}B & & & C\begin{bmatrix} k+ \\ N-1 \end{bmatrix} B & D_\varepsilon \\ C[k+N]A^{N-1}B & \cdots & C\begin{bmatrix} k+ \\ N \end{bmatrix} AB & C\begin{bmatrix} k+ \\ N \end{bmatrix} B & D_\varepsilon \end{bmatrix} \quad (43)$$

The slack terms are introduced in the last row of $V_\varepsilon$.

In this case, the slack terms in the first half are set to 0 and the slack terms in the latter half are allowed to be generated.

This clearly represents the case where the first half of the prediction interval is "the sub-interval including no contact point whose position can be changed" (unadjustable sub-interval) and the latter half of the prediction interval is "the sub-interval including a contact point whose position can be changed" (adjustable sub-interval).

This is not always the case. For example, the entire prediction interval may be "the sub-interval including no contact point whose position can be changed" (unadjustable sub-interval).

However, since the case where the entire prediction interval is "the sub-interval including no contact point whose position can be changed" (unadjustable sub-interval) requires no further explanation, so the case where the adjustable sub-interval is included in the prediction interval has been described above by way of example.

Further, Expression (28) is expanded in accordance with Uε. While it should be kept in mind that the slack variables are set to be non-negative as shown in Expression (33), an inequality condition expression for stabilizing the contact points to maintain the contact is derived.

$$\begin{bmatrix} P & O \\ O & -I \end{bmatrix} \begin{bmatrix} U[k] \\ \varepsilon \end{bmatrix} \leq \begin{bmatrix} S \\ O \end{bmatrix} \Leftrightarrow P_\varepsilon U_\varepsilon[k] \leq S_\varepsilon \quad (44)$$

When the above Expressions (37), (42), and (44) are summarized, the following expression is expressed as a first convex quadratic programming problem.

$$\min_{U_\varepsilon} \frac{1}{2} U_\varepsilon^T H_\varepsilon U_\varepsilon + F_\varepsilon^T U_\varepsilon \quad (45)$$

$$\text{s.t. } P_\varepsilon U_\varepsilon \leq S_\varepsilon$$

$$V_\varepsilon U_\varepsilon = W$$

The trajectory can be obtained by solving the first convex quadratic programming problem. (Since a slack variable is generated as needed, $U\epsilon[k]$ including the slack variable as needed is obtained. When $U[k]$ is substituted into Expression (30) by ignoring the slack variable, $X[k+1]$ is obtained. That is, the xy center-of-gravity trajectories and the forces (six-axis force) generated at each contact point are obtained.)

At this time, when a slack variable value is allowed to be generated, i.e., when the equation of equilibrium cannot be satisfied in "the sub-interval including a contact point whose position can be changed" (adjustable sub-interval), a solution ($U\epsilon[k]$) where a value is included in the slack term is obtained.

As a result, the divergence of the trajectory can be avoided, but it is necessary to compensate for the value in the slack term by changing the contact position.

Needless to say, the slack variable is zero when the equation of equilibrium can be satisfied without generating any slack variable, and in "the sub-interval including no contact point whose position can be changed" (unadjustable sub-interval).

Strictly speaking, even when the equation of equilibrium can be satisfied without generating any slack variable, the slack variable is not equal to zero. As a result of calculation, an extremely small value is generated as the slack variable. For example, a solution where the slack variable is generated in the order of $10^{-10}$ or the like is obtained. However, based on common sense, it can be said that the value in the order of $10^{-10}$ or the like is substantially zero.

(Calculation of the Amount of Change in Contact Position)

A calculation process in which the amount of change in the contact position necessary for maintaining the stability is obtained from the generated slack variable value will be described.

When Expression (45) is solved, $U\epsilon[k]$ is obtained and E is also obtained. Accordingly, $\epsilon x$ and $\epsilon y$ are obtained by using Expression (33).

Here, the amount $\Delta pi$ in change of the contact position of the i-th contact point is expressed as follows and is added to the equation of equilibrium for the moment in Expression (6). As a result, the following Expression (46) is obtained.

$$\Delta p_i := [\Delta p_{ix} \ \Delta p_{iy} \ \Delta p_{iz}]^T \quad (46)$$

$$\dot{L}_x[j] + \varepsilon_x = -F_z[j]y_g[j] + \sum((p_{iy}[j] + \Delta p_{iy})f_{iz}[j] -$$
$$(p_{iz}[j] + \Delta p_{iz} - z_g[j])f_{iy}[j] + \tau_{ix}[j])$$

$$\dot{L}_y[j] + \varepsilon_y = F_z[j]x_g[j] + \sum(p_{iz}[j] + \Delta p_{iz} - z_g[j])f_{ix}[j] -$$
$$(p_{ix}[j] + \Delta p_{ix})f_{iz}[j] + \tau_{iy}[j])$$

When Expression (6) that should be primarily satisfied is subtracted from Expression (46), the following expression is obtained.

$$\begin{cases} \sum (\Delta p_{iy} f_{iz}[j] - \Delta p_{iz} f_{iy}[j]) = \varepsilon_x \\ \sum (\Delta p_{iz} f_{ix}[j] - \Delta p_{ix} f_{iz}[j]) = \varepsilon_y \end{cases} \quad (47)$$

A case in which the change of the contact position is limited within the contact surface will be considered below.

Specifically, the operation for changing the contact position is performed in the form of a translation within the contact surface. In the case of walking, the operation corresponds to a translation on the ground of the planned landing position on the ground.

(The position where the foot(feet) lands (or the hand(s) is(are) placed) can be moved more freely. If the robot is informed of the types of surfaces in the space, the position where the foot(feet) lands (or the hand(s) is(are) placed) can be more freely selected. For example, the position where the hand(s) is (are) placed can be changed from a lower shelf to an upper shelf. However, the computing load increases as a matter of course.)

Here, a contact position movement amount $\Delta p_i^l$ (the superscript indicates the lower-case letter "l") in the coordinate system of the contact point is introduced.

$$\Delta p_i^l = [\Delta p_{ix}^l \Delta p_{iy}^l]^T \quad (48)$$

Figure 17:
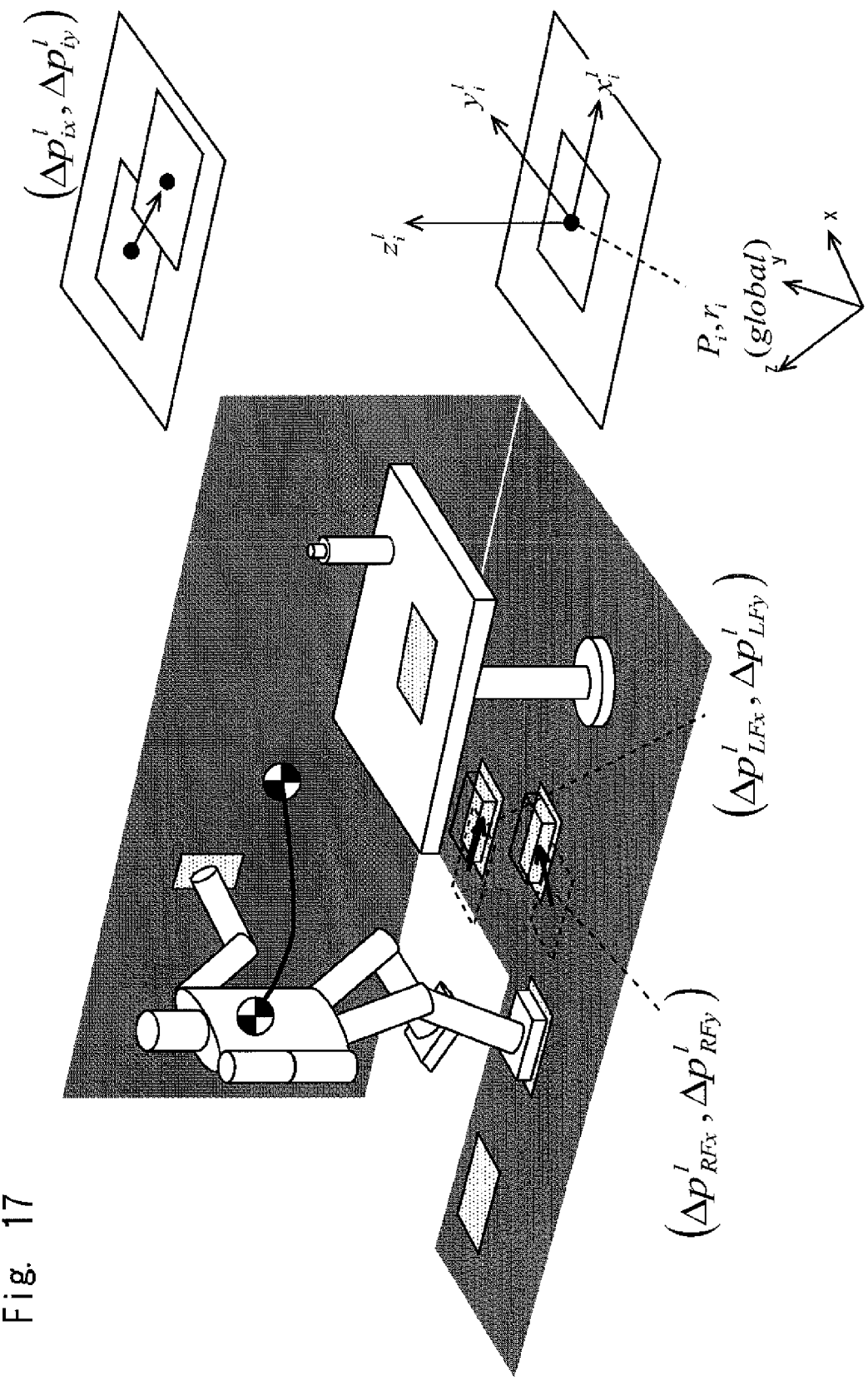
FIG. 17 is a view illustrating an amount of change in the positions of the contact points.

As shown in FIG. 17, $\Delta p_{ix}^l$ and $\Delta p_{iy}^l$ are defined by the amount of change in the xy direction in the local coordinate system of the contact point. The movement of the contact position in the coordinate system of the contact point is transformed into a global coordinate system.

$$\begin{bmatrix} \Delta p_{ix} \\ \Delta p_{iy} \\ \Delta p_{iz} \end{bmatrix} = \Phi_i \begin{bmatrix} \Delta p_{ix}^l \\ \Delta p_{iy}^l \\ 0 \end{bmatrix} = \begin{bmatrix} r_{11}^i & r_{12}^i & r_{13}^i \\ r_{21}^i & r_{22}^i & r_{23}^i \\ r_{31}^i & r_{32}^i & r_{33}^i \end{bmatrix} \begin{bmatrix} \Delta p_{ix}^l \\ \Delta p_{iy}^l \\ 0 \end{bmatrix} = \begin{bmatrix} r_{11}^i \Delta p_{ix}^l + r_{12}^i \Delta p_{iy}^l \\ r_{21}^i \Delta p_{ix}^l + r_{22}^i \Delta p_{iy}^l \\ r_{31}^i \Delta p_{ix}^l + r_{32}^i \Delta p_{iy}^l \end{bmatrix} \quad (49)$$

When the above expression is substituted into Expression (47), the following expression can be obtained.

$$\begin{cases} \sum ((r_{21}^i \Delta p_{ix}^l + r_{22}^i \Delta p_{iy}^l)f_{iz}[j] - (r_{31}^i \Delta p_{ix}^l + r_{32}^i \Delta p_{iy}^l)f_{iy}[j]) = \varepsilon_x \\ \sum ((r_{31}^i \Delta p_{ix}^l + r_{32}^i \Delta p_{iy}^l)f_{ix}[j] - (r_{11}^i \Delta p_{ix}^l + r_{12}^i \Delta p_{iy}^l)f_{iz}[j]) = \varepsilon_y \end{cases} \quad (50)$$

$$\Rightarrow \begin{cases} \sum ((r_{21}^i f_{iz}[j] - r_{31}^i f_{iy}[j])\Delta p_{ix}^l + (r_{22}^i f_{iz}[j] - r_{32}^i f_{iy}[j])\Delta p_{iy}^l) = \varepsilon_x \\ \sum ((r_{31}^i f_{ix}[j] - r_{11}^i f_{iz}[j])\Delta p_{ix}^l - (r_{32}^i f_{ix}[j] - r_{12}^i f_{iz}[j])\Delta p_{iy}^l) = \varepsilon_y \end{cases}$$

$$\Rightarrow \begin{cases} \sum (\sigma_{11}^i[j]\Delta p_{ix}^l + \sigma_{12}^i[j]\Delta p_{iy}^l) = \varepsilon_x \\ \sum (\sigma_{11}^i[j]\Delta p_{ix}^l + \sigma_{12}^i[j]\Delta p_{iy}^l) = \varepsilon_y \end{cases}$$

where:

$$\sigma_{11}^i[j] := r_{21}^i f_{iz}[j] - r_{31}^i f_{iy}[j]$$

$$\sigma_{12}^i[j] := r_{22}^i f_{iz}[j] - r_{32}^i f_{iy}[j]$$

$$\sigma_{21}^i[j] := r_{31}^i f_{ix}[j] - r_{11}^i f_{iz}[j]$$

$$\sigma_{22}^i[j] := r_{32}^i f_{ix}[j] - r_{12}^i f_{iz}[j]$$

In this case, the condition for the amount of change in the contact position necessary to compensate for the generated slack variable can be expressed as follows.

if $\epsilon_x \geq 0$ $\Sigma(\sigma_{11}{}^i[j]\Delta p_{ix}{}^l + \sigma_{12}{}^i[j]\Delta p_{iy}{}^l) \geq \epsilon_x$ else $\Sigma(\sigma_{11}{}^i[j]\Delta p_{ix}{}^l + \sigma_{12}{}^i[j]\Delta p_{iy}{}^l) \leq \epsilon_x$ end if $\epsilon_y \geq 0$ $\Sigma(\sigma_{21}{}^i[j]\Delta p_{ix}{}^l + \sigma_{22}{}^i[j]\Delta p_{iy}{}^l) \geq \epsilon_y$ else $\Sigma(\sigma_{11}{}^i[j]\Delta p_{ix}{}^l + \sigma_{22}{}^i[j]\Delta p_{iy}{}^l) \leq \epsilon_y$ end Expression (51) represents that the effect (left-hand side) obtained by changing the contact position is preferably equal to or greater than the slack variable (right-hand side).

The above expression can be summarized as follows in terms of symbols.

$$\begin{cases} -\text{sgn}(\varepsilon_x)\sum (\sigma^j_{11}[j]\Delta p^l_{ix} + \sigma^j_{12}[j]\Delta p^l_{iy}) \leq -\text{sgn}(\varepsilon_x)\varepsilon_x \\ -\text{sgn}(\varepsilon_y)\sum (\sigma^j_{21}[j]\Delta p^l_{ix} + \sigma^j_{22}[j]\Delta p^l_{iy}) \leq -\text{sgn}(\varepsilon_y)\varepsilon_y \end{cases} \quad (52)$$

Expression (52) can be reordered as follows.

$$\sum \Lambda_i[j]\Delta p^l_i \leq \sigma_\varepsilon \quad (53)$$

$$\Lambda_i[j] := -\begin{bmatrix} \text{sgn}(\varepsilon_x)\sigma^j_{11}[j] & \text{sgn}(\varepsilon_x)\sigma^j_{12}[j] \\ \text{sgn}(\varepsilon_y)\sigma^j_{21}[j] & \text{sgn}(\varepsilon_y)\sigma^j_{22}[j] \end{bmatrix}$$

$$\sigma_\varepsilon := \begin{bmatrix} -\text{sgn}(\varepsilon_x)\varepsilon_x \\ -\text{sgn}(\varepsilon_y)\varepsilon_y \end{bmatrix}$$

Incidentally, the amount of change in the contact position is allowed only when there is a target contact point, as a matter of course.

Figure 18:
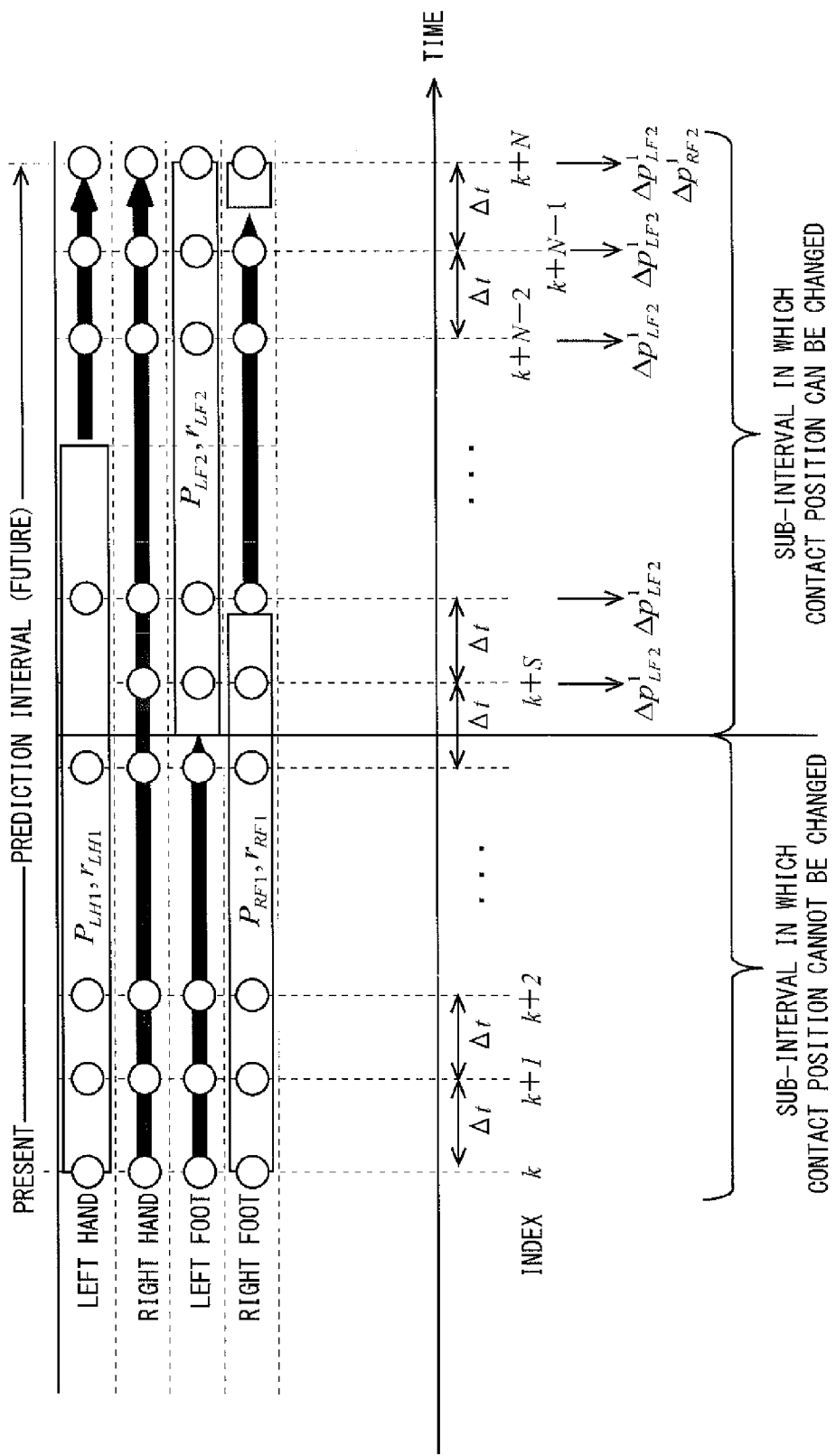
FIG. 18 is a diagram illustrating a state where the amount of change in each position is defined for individual contact points.

For example, in the example shown in FIG. 18, there is no amount of change in the contact position in "the sub-interval including no contact point whose position can be changed" (unadjustable sub-interval).

Also in "the sub-interval including a contact point whose position can be changed" (adjustable sub-interval), the amount of change in the contact position can be defined only in the location including a target in which the position where the foot(feet) lands (or the hand(s) is(are) placed) can be actually changed.

Specifically, $\Delta p_{LF2}{}^l$ (change in the landing position of the left foot) can be allowed within the range of k+s to k+N, and $\Delta p_{RF2}{}^l$ (change in the landing position of the right foot) can be allowed only when k+N. (For ease of understanding, "1" is represented as "LF" and "RF".)

Accordingly, when Expression (41) is rewritten in accordance with the example shown in FIG. 17, for example, the following expression is obtained.

$\Lambda_{LF2}[j]\Delta p^l_{LF2} \leq \sigma_\varepsilon (j=k++s, \ldots, k+N-1)$ $\Lambda_{LF2}[j]\Delta p^l_{LF2} + \Lambda_{RF2}[j]\Delta p^l_{RF2} \leq \sigma_\varepsilon (j=k+N)$ Further, the vector $U_\Delta$ in which the contact position change amounts are vertically arranged is defined.

$$U_\Delta := \begin{bmatrix} \Delta p^l_1 \\ \Delta p^l_2 \\ \vdots \end{bmatrix} \quad (55)$$

however in this example, $$U_\Delta := \begin{bmatrix} \Delta p^l_{LF2} \\ \Delta p^l_{RF2} \end{bmatrix}$$

Expression (54) can be summarized as follows.

$$\begin{bmatrix} \Lambda_{LF2}[k+s] & 0 \\ \vdots & \vdots \\ \Lambda_{LF2}[k+N-1] & 0 \\ \Lambda_{LF2}[k+N] & \Lambda_{RF2}[k+N] \end{bmatrix} \begin{bmatrix} \Delta p^l_{LF2} \\ \Delta p^l_{RF2} \end{bmatrix} \leq \begin{bmatrix} \sigma_\varepsilon \\ \vdots \\ \sigma_\varepsilon \\ \sigma_\varepsilon \end{bmatrix} \quad (56)$$

$$\Leftrightarrow P_\Delta U_\Delta \leq S_\Delta$$

where:

$$P_\Delta := \begin{bmatrix} \Lambda_{LF2}[k+s] & 0 \\ \vdots & \vdots \\ \Lambda_{LF2}[k+N-1] & 0 \\ \Lambda_{LF2}[k+N] & \Lambda_{RF2}[k+N] \end{bmatrix}$$

$$S_\Delta := \begin{bmatrix} \sigma_\varepsilon \\ \vdots \\ \sigma_\varepsilon \\ \sigma_\varepsilon \end{bmatrix}$$

Assuming that it is preferable to minimize the amount of change in the contact position (in other words, to provide a minimum necessary amount of change in the contact position), the evaluation function of the following expression is further introduced.

$$\min J_2 = \frac{1}{2}\sum |\Delta p^l_i|^2 \quad (57)$$

Expression (57) can be summarized as follows.

$$J_2 = \frac{1}{2}\sum |\Delta p^l_i|^2 = \frac{1}{2}U_\Delta^T U_\Delta \quad (58)$$

When Expression (56) and Expression (58) are simplified, the following expression is finally obtained.

$$\min_{U_\Delta} \frac{1}{2} U_\Delta^T U_\Delta \quad (59)$$

$$\text{s.t.} \quad P_\Delta U_\Delta \leq S_\Delta$$

In this manner, a second convex quadratic programming problem can be constructed.

By solving this problem, the minimum amount of change in the contact position necessary for maintaining the stability can be obtained.

The function of, for example, limiting the amount of change in the contact force within a certain convex region (in consideration of a movable range) can also be easily achieved by adding a condition to the inequality constraint condition shown in Expression (59).

(Control of Mobile Robot)

A movement control method for the mobile robot will be described.

Figure 19:
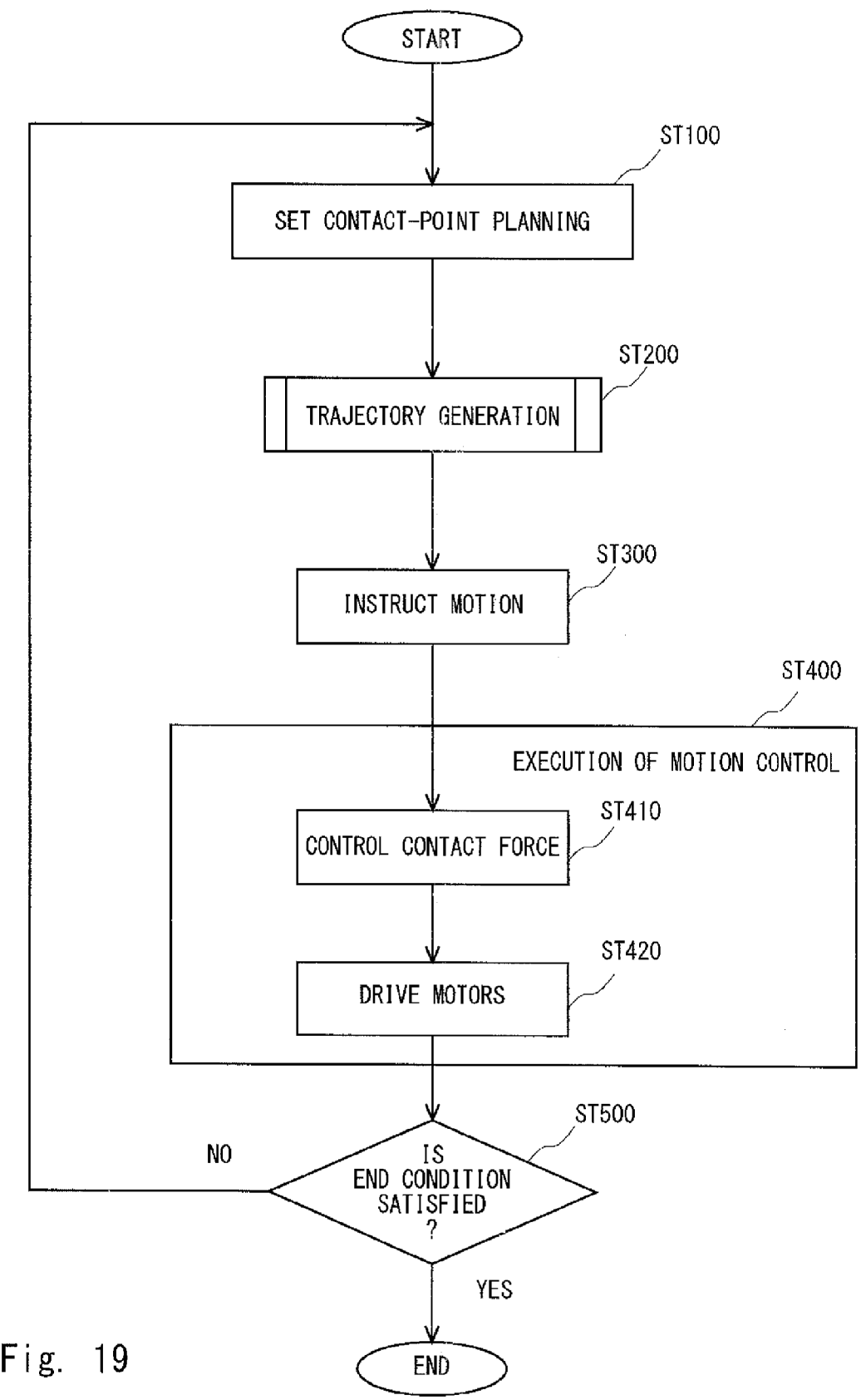
FIG. 19 is a flowchart showing the entire flow of a movement control method for the mobile robot.

FIG. 19 shows the entire flow of the movement control method for the mobile robot.

The main steps of controlling the movement of the mobile robot include: setting of contact-point planning (ST100); trajectory generation (ST200); motion instruction (ST300); and execution of a motion control (ST400).

As outlined above, in the setting of contact-point planning (ST100), the user inputs, to the mobile robot, the multipoint contact movement (FIG. 7) indicating where and how to place the hands and feet and the order in which the hands and feet are placed.

The input contact-point planning is stored in the contact-point planning setting unit 221 of the controller 210.

The trajectory generation step (ST200) will be described.

Figure 20:
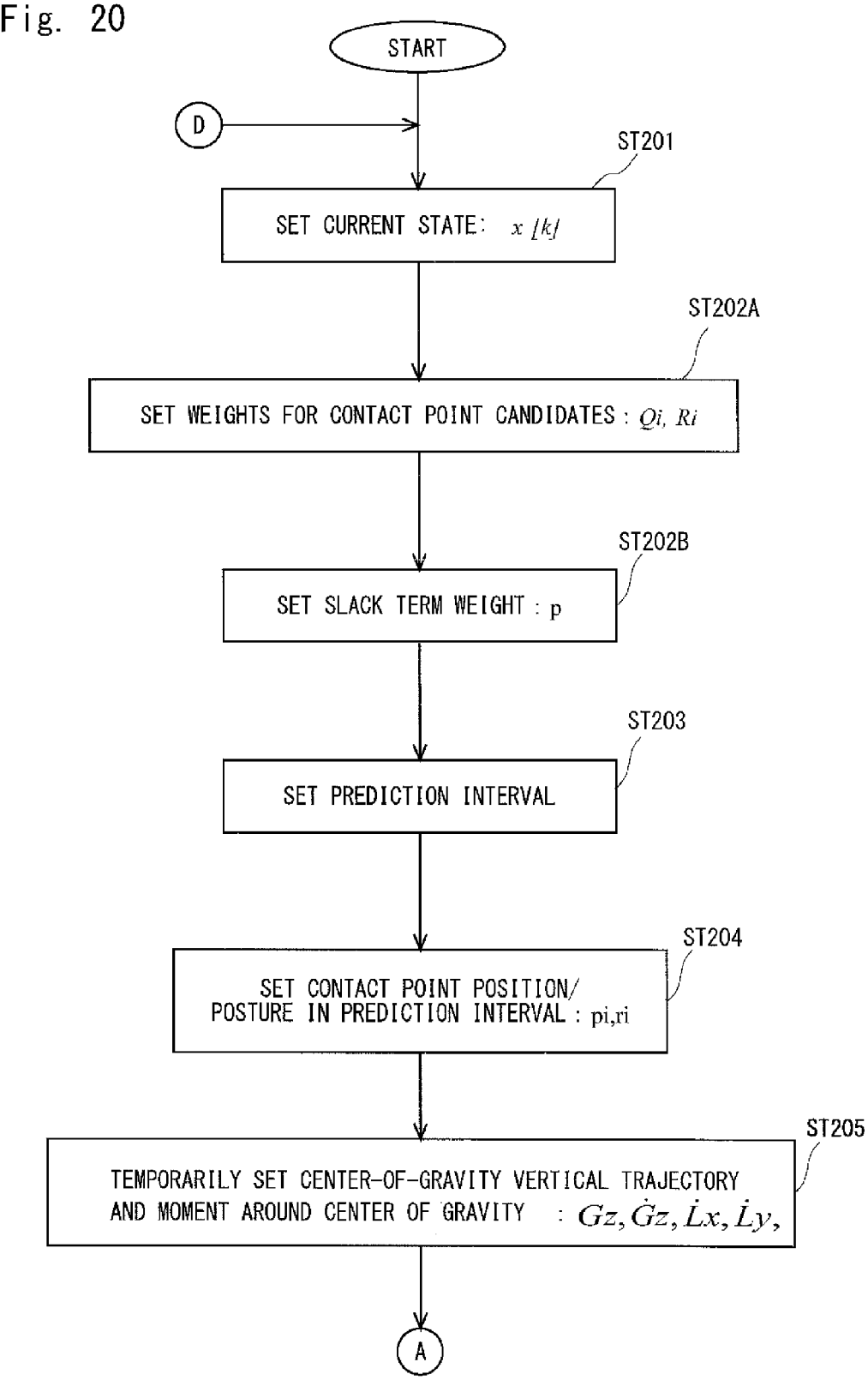
FIG. 20 is a detailed flowchart for explaining a procedure of a trajectory generation step.
Figure 21:
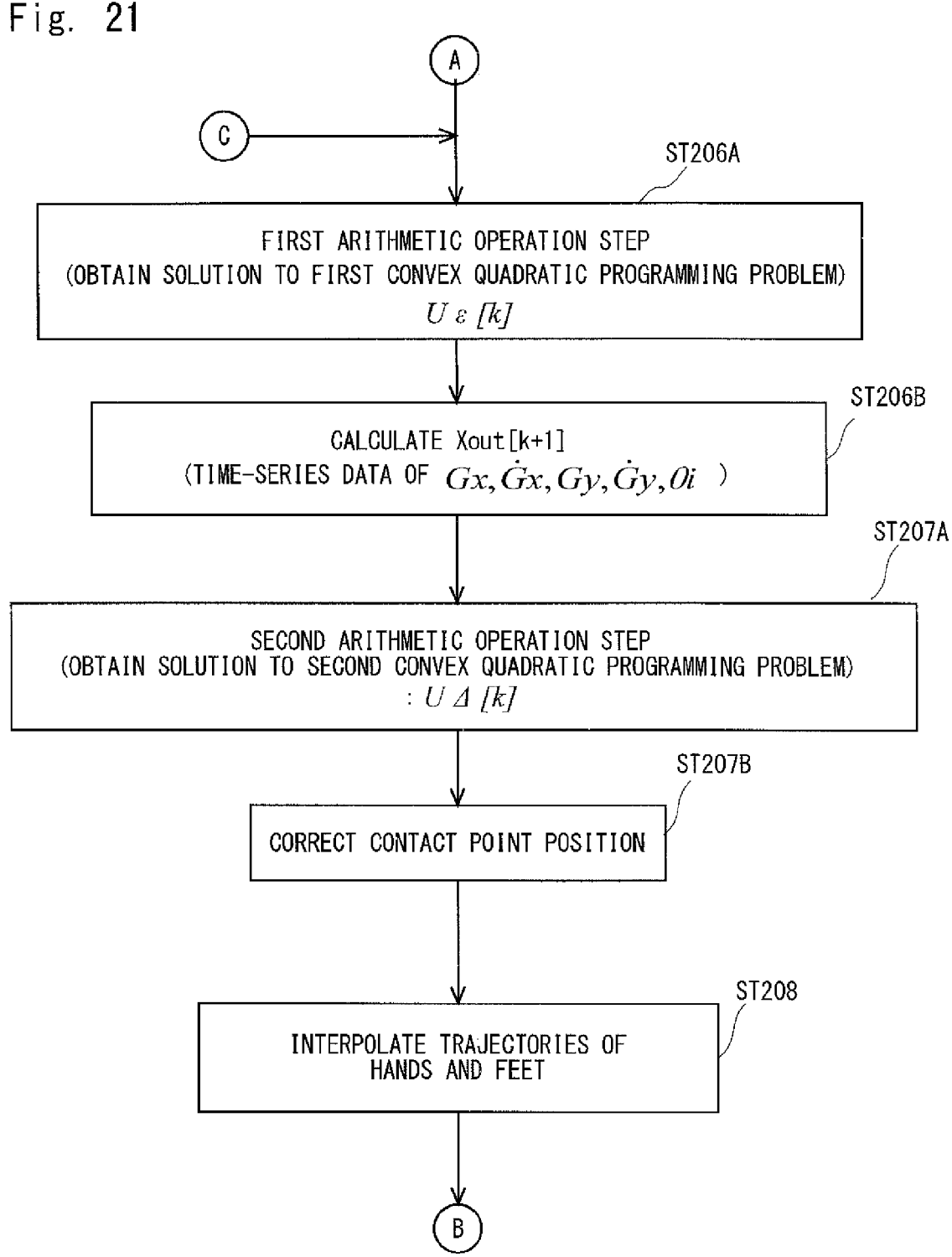
FIG. 21 is a detailed flowchart for explaining the procedure of the trajectory generation step.
Figure 22:
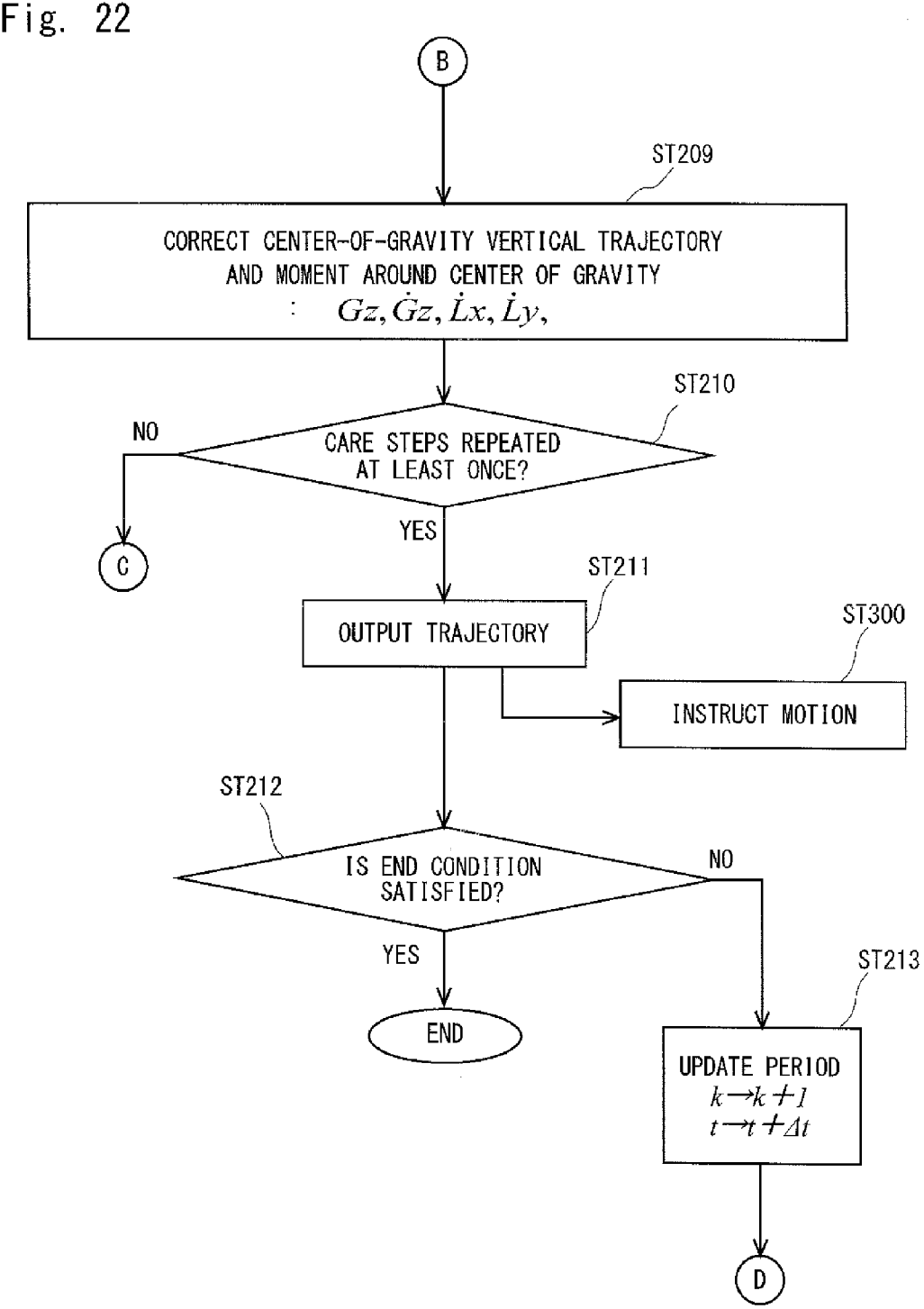
FIG. 22 is a detailed flowchart for explaining the procedure of the trajectory generation step.

FIGS. 20, 21, and 22 are detailed flowcharts for explaining the procedure of the trajectory generation step (ST200).

The trajectory generation step (ST200) is executed by the trajectory generation unit 222 of the controller 210.

First, in ST201, the trajectory generation unit 222 sets the current state x[k]. In this case, the x-coordinate of the center of gravity, the velocity in the x-axis direction of the center of gravity, the y-coordinate of the center of gravity, the velocity in the y-axis direction of the center of gravity, and the contact forces (six-axis forces) at each contact point, all of which are obtained at that time, should be set as the current state (x[k]). The contact forces at each contact point can be obtained by the detected values from the force sensors 29. The x-coordinate of the center of gravity, the velocity in the x-axis direction of the center of gravity, the y-coordinate of the center of gravity, and the velocity in the y-axis direction of the center of gravity are values which are estimated and obtained from the current state of the mobile robot. For example, the x-coordinate of the center of gravity, the velocity in the x-axis direction of the center of gravity, the y-coordinate of the center of gravity, and the velocity in the y-axis direction of the center of gravity may be obtained by acquiring sensor values from each encoder and grasping the entire posture of the mobile robot. Alternatively, the center-of-gravity position may be corrected by grasping the degree of inclination (deviation) of the actual posture of the mobile robot from the assumed posture.

Next, in ST202A, the weights ($Q_i$, $R_i$) are set to the respective contact point candidates. (Note that in the expansion of the above expression, the weights ($Q_i$, $R_i$) are incorporated into the evaluation function J in Expression (11). The weights ($Q_i$, $R_i$) are also taken over in the evaluation function $J_1$ of Expression (32) in which the constraints are relaxed and the slack term is incorporated.)

The weights ($Q_i$, $R_i$) are preliminarily set and input by the user, and the trajectory generation unit 222 reads the weights as needed and updates and sets the read weights. (If it is not necessary to update the weights, there is no need to reconfigure the weights.)

When the forces are distributed equally to all contact point candidates, for example, all $Q_i$ may be set to 1 and all $R_i$ may be set to $1 \times 10^{-6}$. Further, more detailed settings can be made.

The adjustment of the weights enables adjustments to be made, such as an adjustment of the degree at which the change in contact force is made smooth, and an adjustment in which a smaller force is applied to the hands.

For example, assume that the same weight is applied. As a result of arithmetic operations, such a solution that the forces are equally applied to the placed hands and feet (at each contact point) can be obtained. It is generally considered that this case is the most stable form (posture) of the mobile robot.

On the other hand, the allocation of the weights need to be changed in some cases.

For example, in the case where the mobile robot has hands which are weaker (more fragile) than its feet and it is not preferable to apply an excessive load to the hands, the weight on the hands is "increased". As the weight is increased, the value θi and the like of the hands, which are multiplied by the weight, decrease, so that the allocation of the contact force to the hands is reduced.

Further, assume the case where one hand is placed on a table and the other hand is stretched forward to a large extent. In this case, it is insufficient to distribute the forces equally to the hands and feet. It is necessary to further incline the body forward. In order to incline the body and further shift the center of gravity forward, it is necessary to slightly increase the allocation of the forces to be applied to one hand. In this case, it is necessary to make such an adjustment that the weight on one hand is reduced so that the body can be inclined and the other hand can be stretched forward to a large extent.

While there is no need to change the weights in a general operation, the weights may be changed every time the trajectory is updated depending on the state.

In ST202B, the slack term weight ρ is set.

Note that the slack term weight ρ is introduced in Expression (32). As described above, the degree at which the generation of slack variables is allowed can be determined by the ratio (balance) between the weights Q and R and the slack variable weight ρ.

Next, in ST203, the prediction interval is set.

Specifically, as described above with reference to FIG. 8, a predetermined duration (for example, 1.6 seconds) from the present time is set as the prediction interval.

Next, in ST204, the contact point position and the posture (pi, ri) in the prediction interval are set. This operation corresponds to cutting out the contact-point planning in the prediction interval from the contact-point planning (FIG. 7).

Next, in ST205, the center-of-gravity vertical trajectory and the moment around the center of gravity are temporarily set.

Expression (45) (convex quadratic programming problem) is solved in the next arithmetic operation step (ST206), to thereby obtain the trajectory in the xy direction of the center of gravity, the contact forces at each contact point, and the differential values of the contact forces. However, the solution is obtained based on the premise that the position and posture at each contact point, the center-of-gravity vertical trajectory, and the moment around the center of gravity are given.

The position and posture at each contact point within the prediction interval are given by the contact-point planning.

On the other hand, the center-of-gravity vertical trajectory and the moment around the center of gravity within the prediction interval are unknown. Accordingly, the center-of-gravity vertical trajectory and the moment around the center of gravity are temporarily set one time so that Expression (45) (convex quadratic programming problem) can be solved in the arithmetic operation step (ST206).

In the first control cycle, for example, the center-of-gravity vertical trajectory and the moment around the center of gravity may be temporarily set in such a manner that the center-of-gravity vertical trajectory and the moment around the center of gravity are not moved from the current state within the prediction interval. (For example, it may be assumed that the height of the center of gravity is not changed.)

Alternatively, the center-of-gravity vertical trajectory and the moment around the center of gravity which are used in the previous control cycle may be used as temporary values.

The prediction interval is a small amount of time, such as 1.6 seconds. Also in the stable trajectory finally obtained, a change in the height of the center of gravity during the prediction interval is small.

Accordingly, it is possible to proceed with the first provisional calculation assuming that the height of the center of gravity is not changed, or assuming that the center-of-gravity vertical trajectory and the moment around the center of gravity which are used in the previous control cycle are used as temporary values.

In the subsequent step (ST209), the center-of-gravity vertical trajectory and the moment around the center of gravity are corrected so as to stabilize the motion of the mobile robot also in the trajectory in the xy direction of the center of gravity which is obtained in the provisional arithmetic operation. Then the loop is repeated to perform the arithmetic operation (ST206) again by using the corrected center-of-gravity vertical trajectory and the corrected moment around the center of gravity. Therefore, it can be understood that the stable trajectory including the center-of-gravity vertical trajectory can be appropriately obtained at last.

Here, the moment around the center of gravity is defined.

When the mobile robot is considered as a link structure in which links are joined together at each joint, the moment around the center of gravity is the total value of moments generated around the center of gravity by the motion of mass points distributed to the links.

Figure 23A:
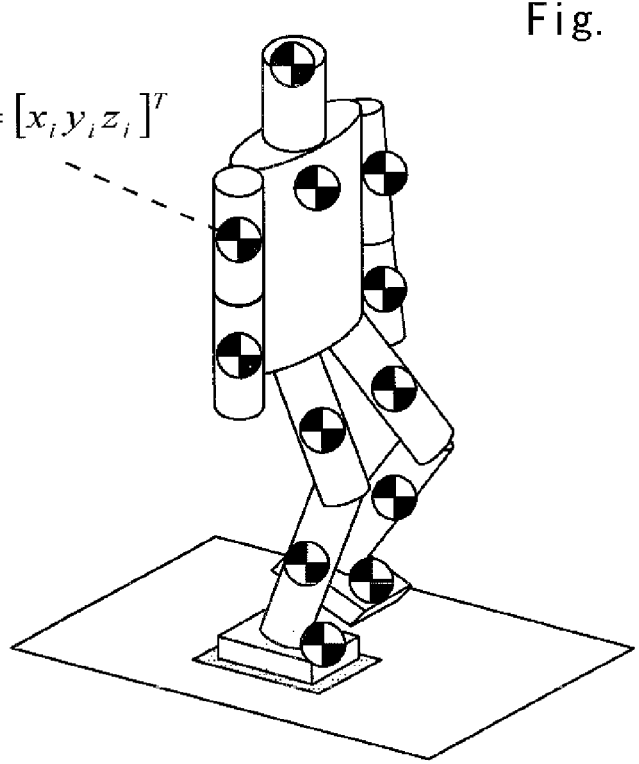
FIG. 23A is a view showing a multi-mass-point model of the mobile robot.

Assume that the mobile robot is represented by a multi-mass-point model as shown in FIG. 23A and M mass points each have the following parameters.

mass: $m_i$, position: $s_i = [x_i, y_i, z_i]^T$

Figure 23B:
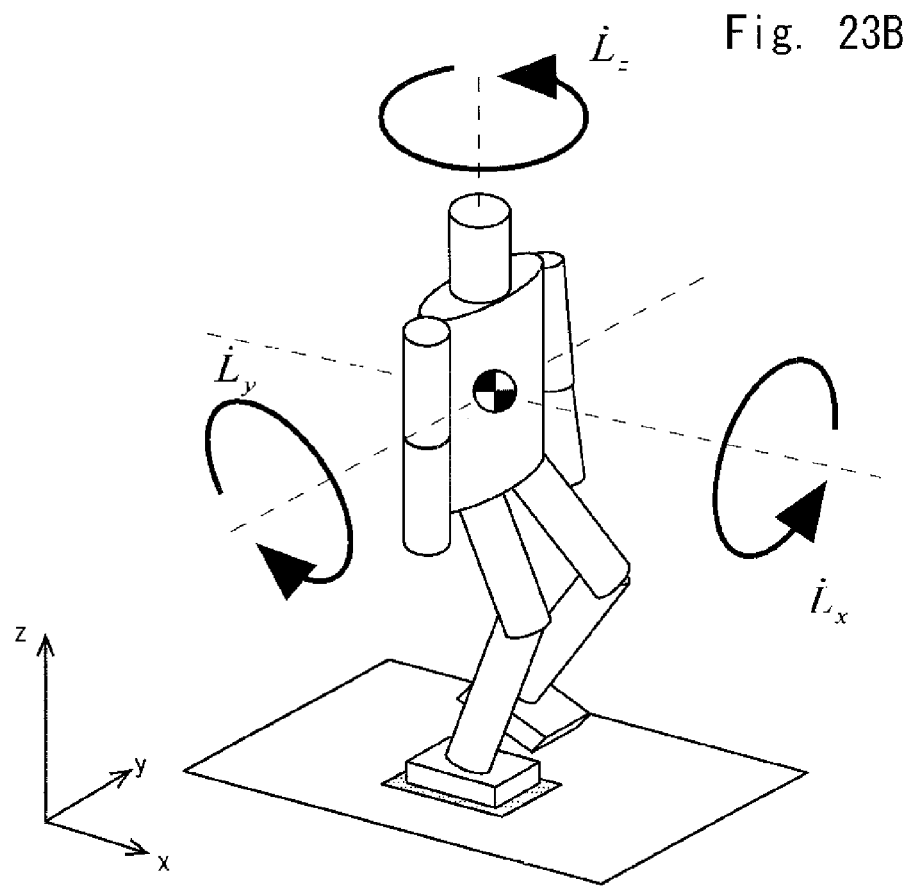
FIG. 23B is a view showing a multi-mass-point model of the mobile robot.

Assuming that the center of gravity of the entire mobile robot is represented by $G = (G_x, G_y, G_z)^T$, the moment around the center of gravity is expressed as follows (see FIG. 23B).

$$\dot{L} = \sum_{i=1}^{M} m_i (s_i - G) \times (\ddot{s}_i - \ddot{G}) \quad (60)$$

Next, in ST206A, a first arithmetic operation step is executed. Specifically, the first convex quadratic programming problem shown in Expression (45) is solved. A trajectory is obtained in which the center of gravity (in this case, x and y correspond to the center of gravity) can be stably shifted, while the forces are appropriately distributed to each contact point within the prediction interval and the contact force is achieved.

Specifically, Hε, Fε, Pε, Sε, Vε, and Wε are obtained, and Uε[k] is also obtained. (Uε[k] represents a vector of contact force differential values. As described above, the vector is expanded so as to introduce the slack variables in Expression (34). Further, in Vε, "the sub-interval including no contact point whose position can be changed" (unadjustable sub-interval) and "the sub-interval including a contact point whose position can be changed" (adjustable sub-interval) are distinguished from each other as described above. See Expression (43).)

Furthermore, $X_{out}[k+1]$ is obtained by Expression (30) (ST206B). ($X_{out}[k+1]$ represents time-series data on the x-coordinate of the center of gravity, the velocity in the x-axis direction of the center of gravity, the y-coordinate of the center of gravity, the velocity in the y-axis direction of the center of gravity, and the contact forces (six-axis forces) at each contact point.)

Further, in ST207A, a second arithmetic operation step is executed. Specifically, the second convex quadratic programming problem shown in Expression (59) is solved. By solving this problem, a minimum contact position change amount necessary for maintaining the stability can be obtained. Accordingly, the contact point position is corrected in ST207B.

Subsequently, the trajectories of the hands and feet are obtained by interpolation in ST208.

Figure 24:
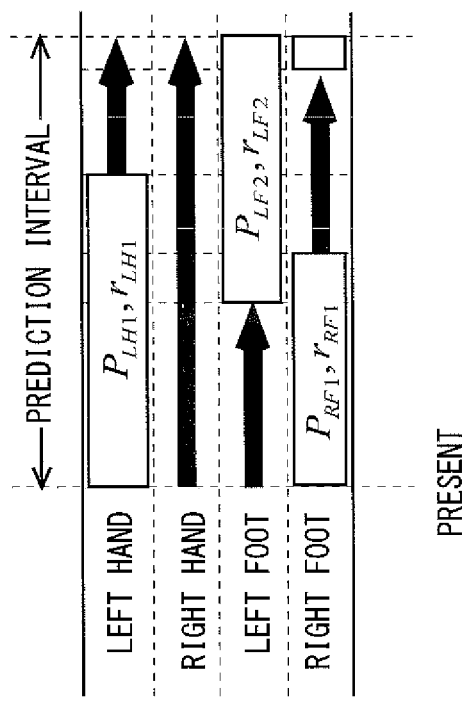
FIG. 24 is a diagram showing a state in which trajectories of hands and feet are interpolated.

In the contact-point planning, only the contact point and the posture obtained at that time are set. Further, the contact position is changed so as to maintain the stability in the previous step ST207B. Based on these factors, the interpolated trajectories of the hands and feet are obtained so as to connect the contact points. As a result, as shown in FIG. 24, the contact points instructed in the contact-point planning are interpolated.

Next, in ST209, an operation for correcting the center-of-gravity vertical trajectory and the moment around the center of gravity is carried out.

First, the center-of-gravity vertical trajectory is corrected. The trajectory in the xy direction of the center of gravity and the trajectories of the hands and feet are obtained in the previous steps. (Also, the center-of-gravity vertical trajectory is temporarily set) Based on these factors, a change in the posture of the mobile robot within the prediction interval can be estimated. However, at this time, if there is an unstable factor, for example, if the knees or arms are fully stretched, the center-of-gravity vertical trajectory is adjusted so as to maintain the stability. For example, an adjustment is made in such a manner that the center-of-gravity vertical trajectory is lowered if the knees are about to be fully stretched. After the posture of the mobile robot within the prediction interval is determined, the moment around the center of gravity is calculated based on the posture.

Next, in ST210, it is determined whether steps ST206A to ST209 are repeated at least one time. If the steps are not repeated, the process returns to ST206A to obtain a solution to the first convex quadratic programming problem.

The center-of-gravity vertical trajectory and the moment around the center of gravity, which are corrected by repeating the arithmetic operation (ST206), are used to obtain $X_{out}[k+1]$ and UΔ[k] again.

In this manner, the time-series data on the center-of-gravity position, the center-of-gravity velocity, a necessary change in the contact point position, and the contact force, which are necessary for achieving the stable movement of the mobile robot within the prediction interval, is obtained (ST211).

Thus, the stable trajectory is generated in the prediction interval having a certain duration, and only the first point is used as the current input value. In other words, only the first point is output to the motion control unit 223 as an operation instruction (ST300).

The period is updated (ST213), that is, the current time is advanced by a small amount of time, until a predetermined end condition is satisfied (ST213), and the process returns to the first step (ST201) to repeat the loop. In this manner, the trajectory generation is repeated while the prediction interval is advanced by a small amount of time. Thus, the calculation of trajectories for stably achieving the multipoint contact movement is carried out.

Though not a feature of this exemplary embodiment, a method in which the motion control unit 223 that has received the operation instruction controls the movement of the mobile robot 100 (drives its joints) will be briefly described.

In this exemplary embodiment, the contact forces at each contact point, as well as the center of gravity and the trajectories of the hands and feet, are given as the operation instruction. Accordingly, the step of performing fine adjustment of the positions (trajectories) of the hands and feet so as to generate the contact forces instructed at each contact point is required (ST410). For example, in the case where a relatively large contact force is instructed when the hand of the mobile robot is placed on the table, the mobile robot performs fine adjustment of the trajectory of the hand so that the hand is pressed against the table.

The motors provided at the respective joints are driven to cause the entire body of the mobile robot to operate (ST420). This allows the mobile robot to operate.

During the execution of the operation (ST400), a deviation occurs between the real robot and the model due to the contact force control (ST410), a failure to properly drive the joints as instructed, or the effect of a disturbance. Accordingly, in the loop of trajectory generation (ST200), it is necessary to set the current state x each time (ST201).

As described above, according to this exemplary embodiment, the mobile robot can autonomously move while automatically generating a stable center-of-gravity trajectory based on planning of the set contact points.

At this time, if the stability of the robot cannot be maintained by the landing of the feet (placing the hand(s)) according to the contact-point planning, the divergence of the trajectory is avoided by changing the contact position as needed, thereby enabling the robot to continuously perform a stable motion.

As can be seen from the meaning of the evaluation function $J_1$, which is used for trajectory generation, the change in the force associated with switching of contact points (transition of contact states) is made smooth, thereby achieving a stable and smooth movement of the mobile robot.

Experimental Examples

Experimental examples will be described below.

Assume that the contact-point planning that allows the hands and feet of a quadruped walking robot to be randomly placed is given to the robot.

FIG. 25 shows a timeline of the contact-point planning.

Figure 26:
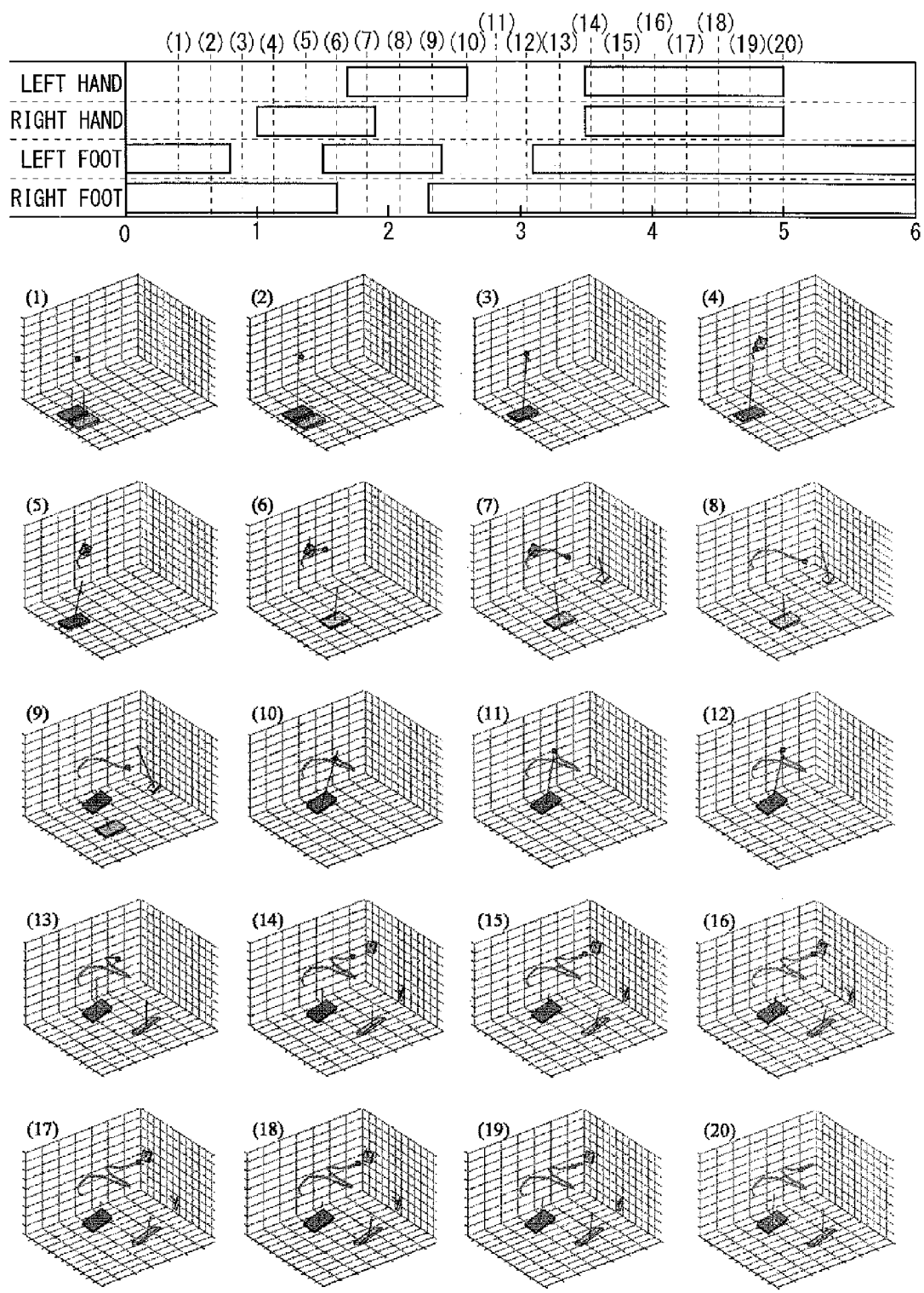
FIG. 26 is a diagram showing snapshots of execution results when there is no disturbance.
Figure 27:
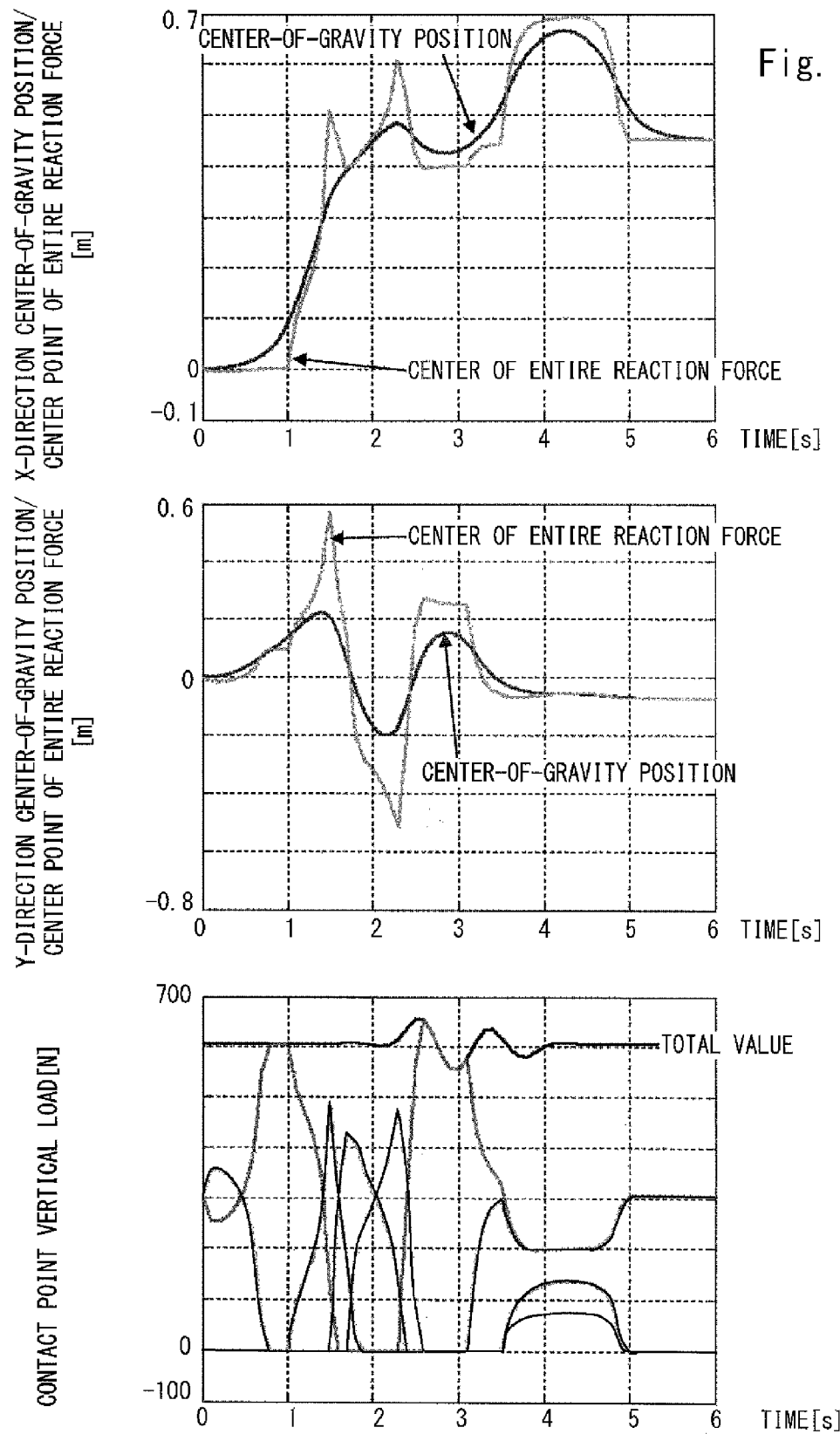
FIG. 27 shows graphs each illustrating a center-of-gravity position, a reaction force center position, and a load in the vertical direction of each contact point.

FIGS. 26 and 27 show simulation results obtained when there is no disturbance.

FIG. 26 shows snapshots of execution results.

FIG. 27 is graph showing a center-of-gravity position, a reaction force center position, and a load in the vertical direction of each contact point during the execution.

In this case, it is obvious that the contact point reaction force associated with switching of contact points smoothly shifts, while the hands and feet are placed on the landing positions (or positions where the hand(s) is(are) placed) according to the contact-point planning, and a smooth movement of the center of gravity is achieved.

Figure 28:
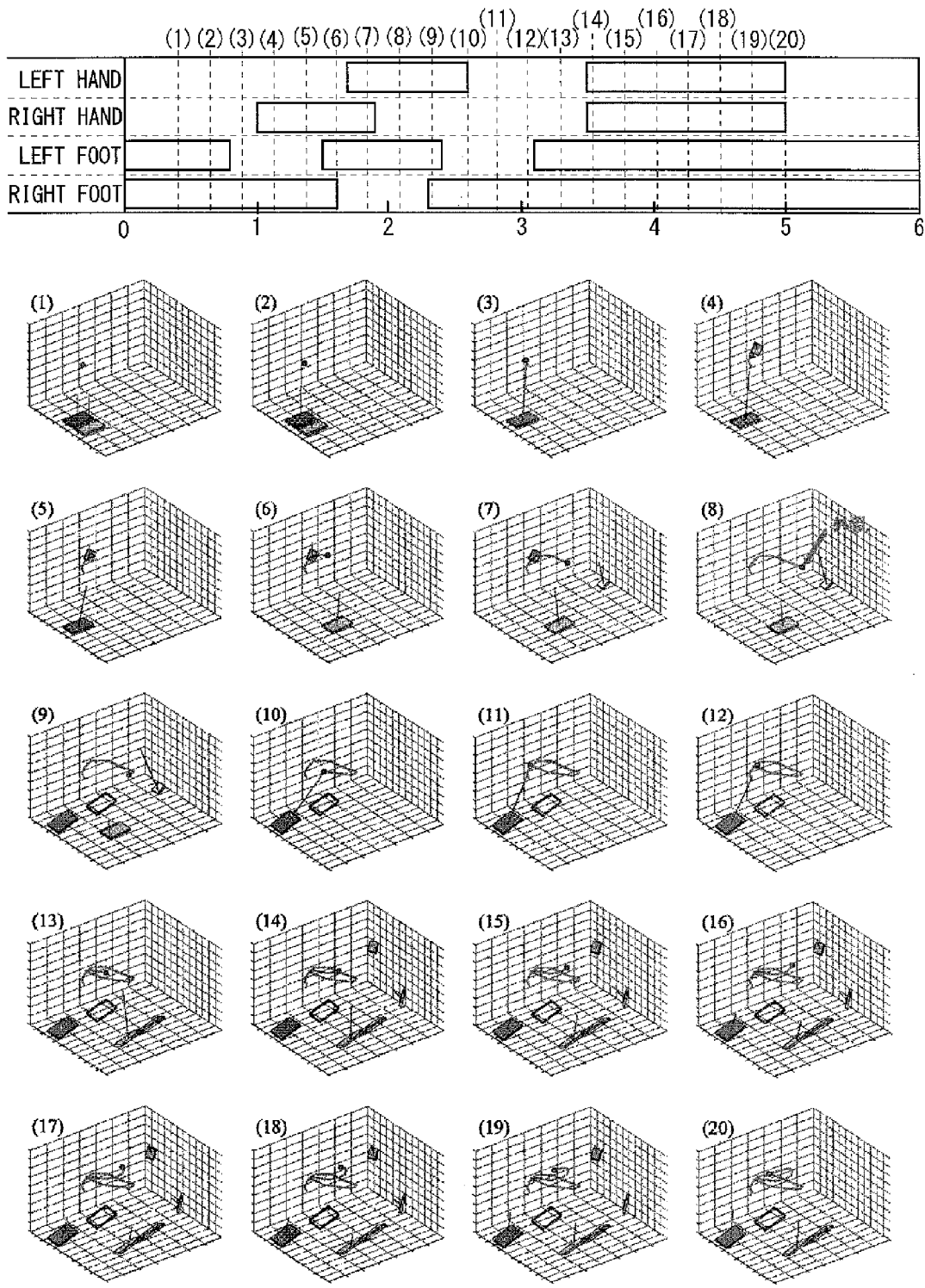
FIG. 28 is a diagram showing snapshots of execution results when a disturbance is input.
Figure 29:
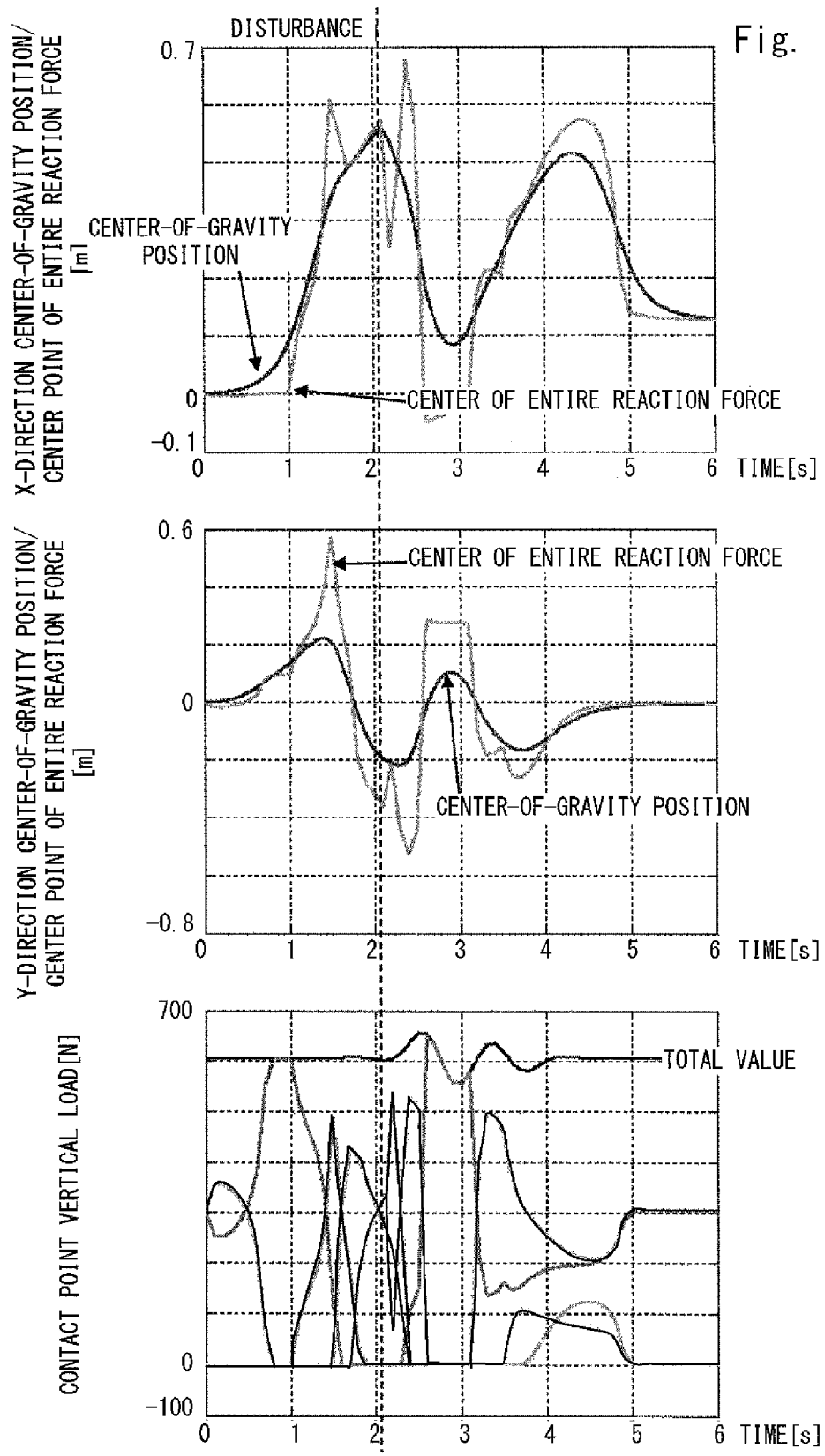
FIG. 29 shows graphs each illustrating the center-of-gravity position, the reaction force center position, and the load in the vertical direction of each contact point.
Figure 30:
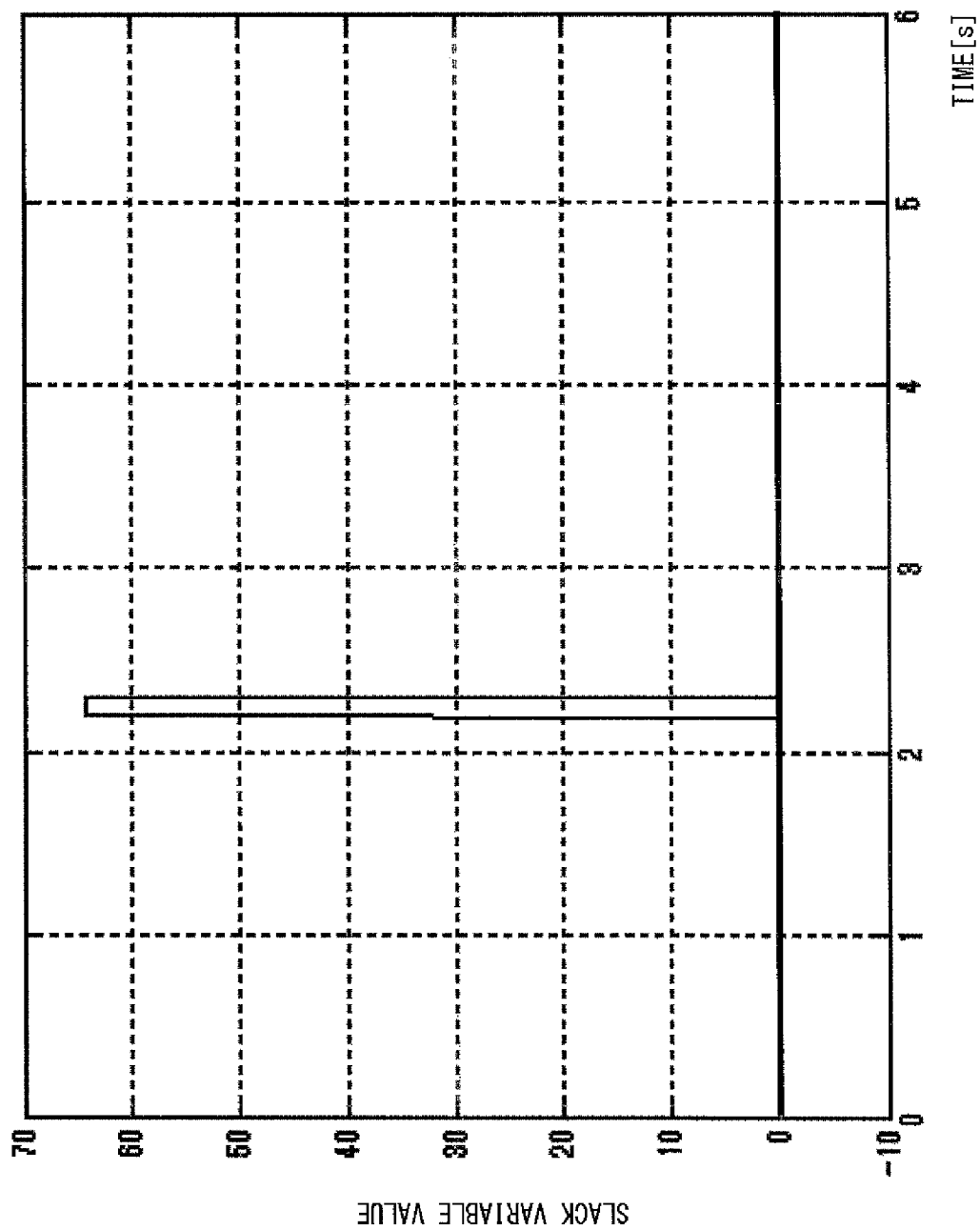
FIG. 30 is a graph showing a slack variable value.

On the other hand, FIGS. 28, 29, and 30 show simulation results obtained when a disturbance is caused to occur.

FIG. 28 shows snapshots of execution results. In this case, assume that a large disturbance is input at around 2.2 seconds.

FIG. 29 is graph showing a center-of-gravity position, a reaction force center position, and a load in the vertical direction of each contact point during the execution.

FIG. 30 is a graph showing a slack variable value.

When FIG. 26 and FIG. 28 are compared, it is obvious that the robot is prevented from overturning by changing the landing position of the left foot immediately after the input of the disturbance (at around 2.2 seconds). As seen from FIG. 30, a slack variable is generated immediately after the input of the disturbance, and after that, the slack variable becomes 0 in the state where there is no disturbance.

Note that the present invention is not limited to the above exemplary embodiments and can be modified as appropriate without departing from the scope of the invention.

The hardware configuration of the mobile robot is not particularly limited. For example, the mobile robot may be a bipedal robot or a quadruped walking robot. Further, the number of the hands and legs of the mobile robot is not particularly limited. For example, the mobile robot may have six legs or eight legs.

However, it is necessary that at least one contact point contact the ground. (Contacting the ground may include a case where the hand(s) of the robot is(are) placed on the wall.)

Figure 31:
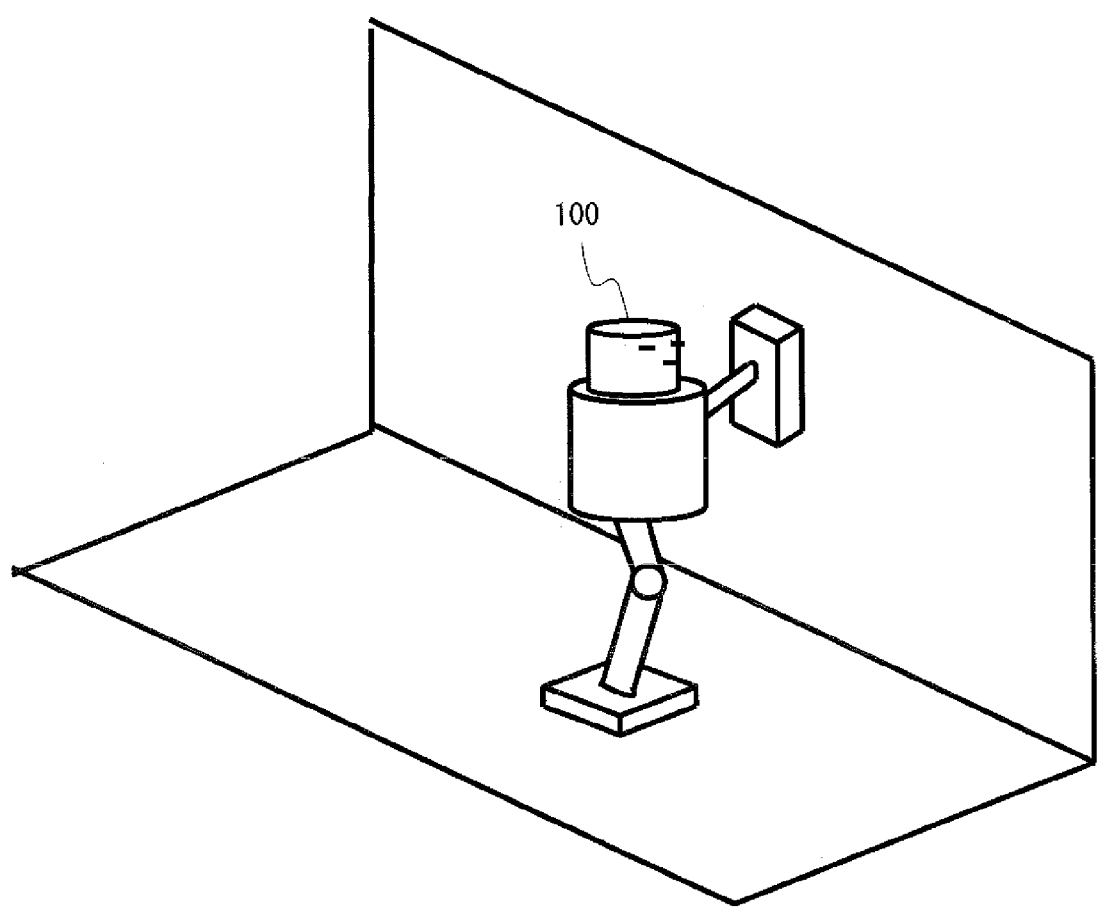
FIG. 31 is a diagram showing a modified example.

In an extreme case, for example, the mobile robot 100 may have one leg and one hand and move while causing its hand and foot to be alternately placed on the floor and the wall as shown in FIG. 31.

The process for obtaining a necessary amount of change in the contact point (ST207A) and changing the contact point based on the obtained amount of change may be carried out as needed.

In other words, a determination step of comparing the magnitude of a slack variable with a predetermined threshold may be incorporated between ST206A and ST207A, to thereby determine if a slack variable equal to or greater than substantially zero is generated.

When a slack variable equal to or greater than substantially zero is generated, it is necessity to change the contact point position. When the slack variable is substantially zero, there is no need to execute steps ST207A and ST207B.

Alternatively, ST207A may be executed regardless of the magnitude of each slack variable, and the determination step of comparing the amount of change in the contact point position with the predetermined threshold may be incorporated between ST207A and ST208B.

When the amount of change in the contact point position is equal to or greater than a predetermined value, it is necessary to change the contact point (ST207B). When the amount of change in the contact point position is substantially zero, there is no need to execute ST207B.

While the threshold is determined depending on the accuracy of the desired stability, it can be said that it is necessary to change the contact point when the amount of change in the contact point position is 1 mm or 2 mm.

Depending on the accuracy of the desired stability, 0.01 mm or 0.02 mm may be set as a threshold for changing the contact point.

A threshold for determining the magnitude of a slack variable can also be obtained by the back calculation of the slack variable when the amount of change in the contact point position is 1 mm or 2 mm.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A movement control method for a mobile robot that moves while causing two or more mobile means to alternately contact the ground, the movement control method comprising:
   a contact-point planning setting step of setting contact-point planning using time-series data representing positions of contact points where the mobile means contact the ground; and
   a trajectory generation step of generating a trajectory for a movement of the mobile robot while causing the mobile means to contact the ground at the contact points as set in the contact-point planning setting step,
   wherein the trajectory generation step includes changing the positions of the contact points when the trajectory diverges.

2. The movement control method for a mobile robot according to claim 1, wherein the trajectory generation step includes:
   constructing a prediction model that describes a relationship between a control input to the mobile robot and a motion of the mobile robot, the prediction model representing a state change of the mobile robot in a prediction interval of a predetermined duration;
   obtaining, in the prediction interval, time-series data on the control input to ensure the stability of the mobile robot, by using a predetermined stability evaluation criterion and a constraint condition based on a mechanical balance;
   obtaining a trajectory of the mobile robot based on the obtained time-series data on the control input and the prediction model;
   introducing a slack variable for relaxing a constraint into the constraint condition;
   introducing a slack variable into the stability evaluation criterion in such a manner that the slack variable becomes substantially zero when a solution to a stable trajectory is obtained under the constraint condition and a value equal to or greater than substantially zero is generated as the slack variable when the trajectory diverges under the constraint condition; and
   changing the positions of the contact points so as to cancel the generated value of the slack variable.

3. The movement control method for a mobile robot according to claim 2, wherein when the slack variable is introduced into the constraint condition, the slack variable is introduced into an equation of equilibrium for a moment around an X-axis of a center of gravity of the mobile robot and into an equation of equilibrium for a moment around a Y-axis of the center of gravity of the mobile robot, the X-axis and the Y-axis being orthogonal to each other within a plane perpendicular to a Z-axis corresponding to a vertical direction.

4. The movement control method for a mobile robot according to claim 2, wherein
   the prediction interval is separated into an unadjustable sub-interval including no contact points whose positions can be changed, and an adjustable sub-interval including one or more contact points whose positions can be changed, and
   a value equal to or greater than substantially zero is allowed to be generated as the slack variable only during the adjustable sub-interval.

5. The movement control method for a mobile robot according to claim 2, wherein
   an expression for the constraint condition includes a center-of-gravity vertical trajectory of the mobile robot and a trajectory of a moment around the center of gravity of the mobile robot, and
   the trajectory generation step includes:
      temporarily setting the center-of-gravity vertical trajectory and the trajectory of the moment around the center of gravity of the mobile robot one time within the prediction interval;
      obtaining a solution to a function of the stability evaluation criterion one time under the constraint condition, and changing, based on an obtained result, the positions of the contact points so as to stabilize the motion of the mobile robot within the prediction interval and correcting the center-of-gravity vertical trajectory and the trajectory of the moment around the center of gravity of the mobile robot; and
      recalculating, at least one time, the solution to the function of the stability evaluation criterion by using the changed positions of the contact points, the corrected center-of-gravity vertical trajectory, and the corrected trajectory of the moment around the center of gravity.

6. The movement control method for a mobile robot according to claim 2, wherein
   the trajectory is obtained within the prediction interval in the trajectory generation step,
   the mobile robot is driven by using data on a first point of the prediction interval as a current input value, and
   the trajectory generation step is repeated by advancing the prediction interval by a small amount of time.

7. A mobile robot that moves while causing two or more mobile means to alternately contact the ground, the mobile robot comprising:
   a contact-point planning setting unit that sets contact-point planning using time-series data representing positions of contact points where the mobile means contact the ground; and
   a trajectory generation unit that generates a trajectory for a movement of the mobile robot while causing the mobile means to contact the ground on the contact points as set by the contact-point planning setting unit,
   wherein the trajectory generation unit changes the positions of the contact points when the trajectory diverges.

8. The mobile robot according to claim 7, wherein
   the trajectory generation unit is configured to:
      construct a prediction model that describes a relationship between a control input to the mobile robot and a motion of the mobile robot, the prediction model representing a state change of the mobile robot in a prediction interval of a predetermined duration;
      obtain, in the prediction interval, time-series data on the control input to ensure the stability of the mobile robot, by using a predetermined stability evaluation criterion and a constraint condition based on a mechanical balance;
      obtain a trajectory of the mobile robot based on the obtained time-series data on the control input and the prediction model;

introduce a slack variable for relaxing a constraint into the constraint condition;

introduce a slack variable into the stability evaluation criterion in such a manner that the slack variable becomes substantially zero when a solution to a stable trajectory is obtained under the constraint condition and a value equal to or greater than substantially zero is generated as the slack variable when the trajectory diverges under the constraint condition; and change the positions of the contact points so as to cancel the generated value of the slack variable.

\* \* \* \* \*